US010338186B2

(12) United States Patent
Yates et al.

(10) Patent No.: US 10,338,186 B2
(45) Date of Patent: Jul. 2, 2019

(54) POSITIONAL TRACKING SYSTEMS AND METHODS

(71) Applicant: VALVE CORPORATION, Bellevue, WA (US)

(72) Inventors: Alan Yates, Bellevue, WA (US); Jeremy Selan, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 538 days.

(21) Appl. No.: 14/937,844

(22) Filed: Nov. 10, 2015

(65) Prior Publication Data

US 2016/0131761 A1   May 12, 2016

Related U.S. Application Data

(60) Provisional application No. 62/126,358, filed on Feb. 27, 2015, provisional application No. 62/077,374, filed on Nov. 10, 2014.

(51) Int. Cl.
*G01S 1/70* (2006.01)
*G01S 7/481* (2006.01)

(52) U.S. Cl.
CPC .............. *G01S 1/70* (2013.01); *G01S 7/481* (2013.01)

(58) Field of Classification Search
CPC ..... G01S 1/50; G01S 1/52; G01S 1/70; G01S 7/4815; G01S 7/4817; G01S 7/484; G01S 7/5209
See application file for complete search history.

(56) References Cited

U.S. PATENT DOCUMENTS

| 3,698,816 | A | * | 10/1972 | Lutchansky | G01S 1/70 342/398 |
| 4,667,091 | A | * | 5/1987 | Gerlach | G01S 17/66 250/203.1 |
| 4,818,107 | A | † | 4/1989 | Ono | |
| 5,294,970 | A | * | 3/1994 | Dornbusch | G01C 15/002 356/141.1 |

(Continued)

FOREIGN PATENT DOCUMENTS

JP   2002328012   11/2002

OTHER PUBLICATIONS

Supplementary (Extended) European Search Report for Application No. EP 15 85 9458-1206 / 3218736 PCT/US2015060045, completion of the search Jun. 21, 2018, received on Jul. 3, 2018.

(Continued)

*Primary Examiner* — Eric L Bolda
(74) *Attorney, Agent, or Firm* — Lee & Hayes, P.C.

(57) ABSTRACT

Optical positional tracking systems that may be used in virtual reality (VR)/augmented reality (AR) applications are described. Exemplary implementations comprise one or more receivers and one or more transmitters. Exemplary transmitters contains two orthogonal rotors that each emit a fan-shaped laser beam. Each beam is swept as the rotors are spun at constant speed. Exemplary optical receivers can be relatively small, and mounted at convenient locations on the VR display. These receivers consist of small optical detectors that may be mounted on head-mounted VR displays. Exemplary systems determine position by measuring the time at which each swept beam crosses each receiver/detector.

65 Claims, 33 Drawing Sheets

(56) References Cited

U.S. PATENT DOCUMENTS

| | | | |
|---|---|---|---|
| 5,729,475 A * | 3/1998 | Romanik, Jr. | G01B 11/002 |
| | | | 345/158 |
| 5,884,239 A † | 3/1999 | Romanik | |
| 6,501,543 B2 † | 12/2002 | Hedges | |
| 6,630,993 B1 † | 10/2003 | Hedges | |
| 7,292,151 B2 | 11/2007 | Ferguson et al. | |
| 7,952,483 B2 | 5/2011 | Ferguson et al. | |
| 8,159,354 B2 | 4/2012 | Ferguson et al. | |
| 8,427,325 B2 | 4/2013 | Ferguson et al. | |
| 8,887,823 B2 * | 11/2014 | Kamizono | E02F 3/842 |
| | | | 172/4.5 |
| 9,427,659 B2 | 8/2016 | Ferguson et al. | |
| 2002/0154294 A1 | 10/2002 | Hedges et al. | |
| 2004/0125365 A1 † | 7/2004 | Ohtomo | |
| 2005/0122507 A1 | 6/2005 | Detweiler et al. | |
| 2013/0003042 A1 | 1/2013 | Sogard | |
| 2013/0038856 A1 * | 2/2013 | Williams | G01C 15/002 |
| | | | 356/3.12 |

OTHER PUBLICATIONS

Japanese Office Action dated Jan. 17, 2019, for Japanese Patent Application No. 2017-544565, a counterpart foreign application of the U.S. Appl. No. 14/937,844, 11 pages.

\* cited by examiner
† cited by third party

POSITIONAL TRACKING SYSTEMS AND METHODS

CROSS-REFERENCE TO RELATED APPLICATIONS

This application claims the benefit of Provisional Application Ser. Nos. 62/077,374, filed on Nov. 10, 2014, and 62/126,358, filed on Feb. 27, 2015, and the contents of both of those applications are herein incorporated by reference in their entirety.

BACKGROUND OF THE DISCLOSURE

1. Field of the Disclosure

The disclosure relates generally to positional tracking, and more particularly to optics-based positional tracking systems and methods for virtual reality and/or augmented reality applications with improved features and characteristics.

2. General Background

Various positional tracking systems and methods are known in the art, varying in parameters such as tracking precision, tracking volume, tracking markers, manufacturing cost, and complexity of user setup. One current generation of desktop virtual reality ("VR") experiences are created using head-mounted displays ("HMDs"), which can be tethered to a stationary computer (such as a personal computer ("PC"), laptop, or game console), or self-contained. In addition, desktop VR experiences generally try to be fully immersive and disconnect the users' senses from their surroundings. The tracking requirements for a wide variety of applications in this technical space can be met by a system that tracks six degrees of freedom ("6DOF") positions of multiple rigid objects (e.g., HMD, input wand, desktop geometry) in a tracking volume typically limited to approximately two cubic meters. However, to create more immersive VR experiences, the tracking system is required to be precise (e.g., down to one millimeter and one-degree precision) while maintaining very low latency (e.g., approximately one millisecond delay between action and response). In addition, it is typically desirable that the tracking technology should be relatively easy to set up and affordable to the average home user.

Certain positional tracking systems currently known in the art fully or partially rely on tracking markers attached to objects, and then track the marked objects. In such systems, a tracked object typically must be covered with large tracking markers that can encode several bits of data, such that typically only large objects can be tracked. For this reason most such systems, known as "PTAM/SLAM systems" (acronyms for Positional Tracking and Mapping for Small AR Workspaces, and Simultaneous Localization and Mapping, respectively), locate the camera on the HMD and place the tracking markers on the walls of the environment. This approach has several disadvantages, for example: it typically requires the VR user to greatly modify the appearance of his or her environment by covering all viewing directions with large tracking markers; it typically requires the user to perform a complex calibration step in order to the map the environment; and the tracking cameras attached to the HMD typically require a good lens for precise tracking, and this increases the weight of the HMD, typically significantly. Since the tracking markers are typically complex in design in such implementations, their decoding is usually performed on the PC instead of an onboard processor in or near the HMD, and this typically increases the amount of data sent from the camera to the computer and the tracking latency.

Advances in computer vision algorithms have made it possible to do away with tracking markers in limited scenarios by using natural image/scene features instead. Unfortunately, current tracking algorithms that rely on natural image features are typically not robust/precise enough to work consistently in many home environments, which often contain transparent, shiny, and/or textureless objects. Extracting and identifying natural features from images also tends to be computationally expensive.

It is desirable to address the current limitations in this art.

BRIEF DESCRIPTION OF THE DRAWINGS

By way of example, reference will now be made to the accompanying drawings, which are not to scale.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Figure 1:
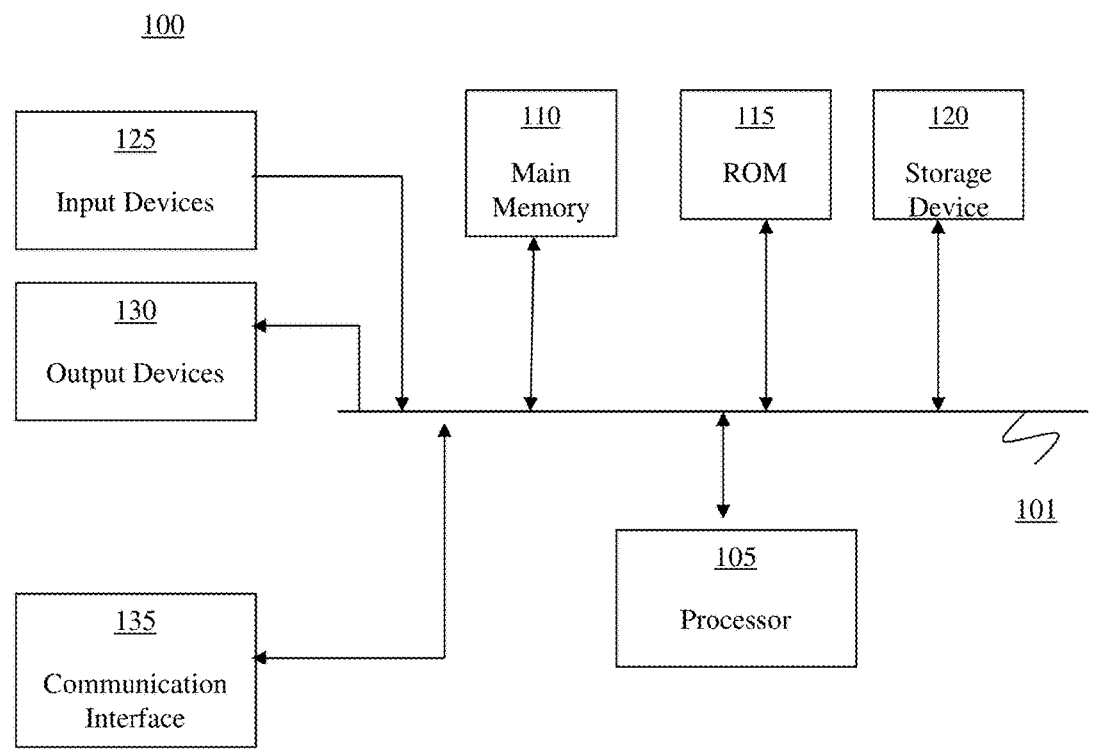
FIG. 1 is an exemplary diagram of a computing device that may be used to implement aspects of certain embodiments of the present invention.

FIG. 1 is an exemplary diagram of a computing device 100 that may be used to implement aspects of certain embodiments of the present invention. Computing device 100 may include a bus 101, one or more processors 105, a main memory 110, a read-only memory (ROM) 115, a storage device 120, one or more input devices 125, one or more output devices 130, and a communication interface 135. Bus 101 may include one or more conductors that permit communication among the components of computing device 100. Processor 105 may include any type of conventional processor, microprocessor, or processing logic that interprets and executes instructions. Main memory 110 may include a random-access memory (RAM) or another type of dynamic storage device that stores information and instructions for execution by processor 105. ROM 115 may include a conventional ROM device or another type of static storage device that stores static information and instructions for use by processor 105. Storage device 120 may include a magnetic and/or optical recording medium and its corresponding drive. Input device(s) 125 may include one or more conventional mechanisms that permit a user to input information to computing device 100, such as a keyboard, a mouse, a pen, a stylus, handwriting recognition, voice recognition, biometric mechanisms, and the like. Output device(s) 130 may include one or more conventional mechanisms that output information to the user, including a display, a projector, an A/V receiver, a printer, a speaker, and the like. Communication interface 135 may include any transceiver-like mechanism that enables computing device/server 100 to communicate with other devices and/or systems. Computing device 100 may perform operations based on software instructions that may be read into memory 110 from another computer-readable medium, such as data storage device 120, or from another device via communication interface 135. The software instructions contained in memory 110 cause processor 105 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, memory 110 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 110 may optionally include one or more storage devices remotely located from the processor(s) 105. Memory 110, or one or more of the storage devices (e.g., one or more non-volatile storage devices) in memory 110, may include a computer readable storage medium. In certain embodiments, memory 110 or the computer readable storage medium of memory 110 may store one or more of the following programs, modules and data structures: an operating system that includes procedures for handling various basic system services and for performing hardware dependent tasks; a network communication module that is used for connecting computing device 110 to other computers via the one or more communication network interfaces and one or more communication networks, such as the Internet, other wide area networks, local area networks, metropolitan area networks, and so on; a client application that may permit a user to interact with computing device 100.

Certain embodiments of the present invention comprise an optical tracking system intended for use in virtual reality installations. Specifically, certain embodiments comprise spatial coding optical tracking technology, suitable for high-resolution, high-accuracy, room-scale multi-user object position and orientation determination ("tracking"). Certain implementations comprise one or more beacon transmitters that broadcast an optical signal spatially modulated in a time-varying manner, allowing one or more sensor units located in the illuminated volume to determine their planar bearing to each beacon transmitter. A single beacon may give one planar bearing to a sensor. Multiple beacons may be used to allow three-dimensional position determination of a single sensor, and arrays of multiple sensors on a rigid tracked object allow its orientation determination. The optically determined position signal is fused with inertial measurements to reduce latency and increase update rate of position determination. Without limitation, the head-mounted-displays ("HMD") that may be used to implement aspects of certain embodiments may be tethered to a stationary computer (such as a personal computer ("PC"), laptop, or game console), or alternatively may be self-contained (i.e., with some or all sensory inputs, controllers/computers, and outputs all housed in a single head-mounted device).

Certain embodiments enable high-resolution position and orientation determination for multiple objects (HMDs, controllers, etc.) over room-scale volumes. In certain implementations, the system is composed of one or more base station units, which sweep an optical signal across the tracking volume. Optical receivers on the tracked objects interpret this signal to compute position and orientation relative to the base station(s). While a single base station is sufficient for six-degree-of-freedom tracking, multiple base stations may be necessary in some embodiments to provide robust room-scale tracking for headsets and peripherals. In certain embodiments, optical receivers are paired with an accelerometer and gyroscope Inertial Measurement Unit (IMU) on each tracked device to support low-latency sensor fusion.

Figure 2:
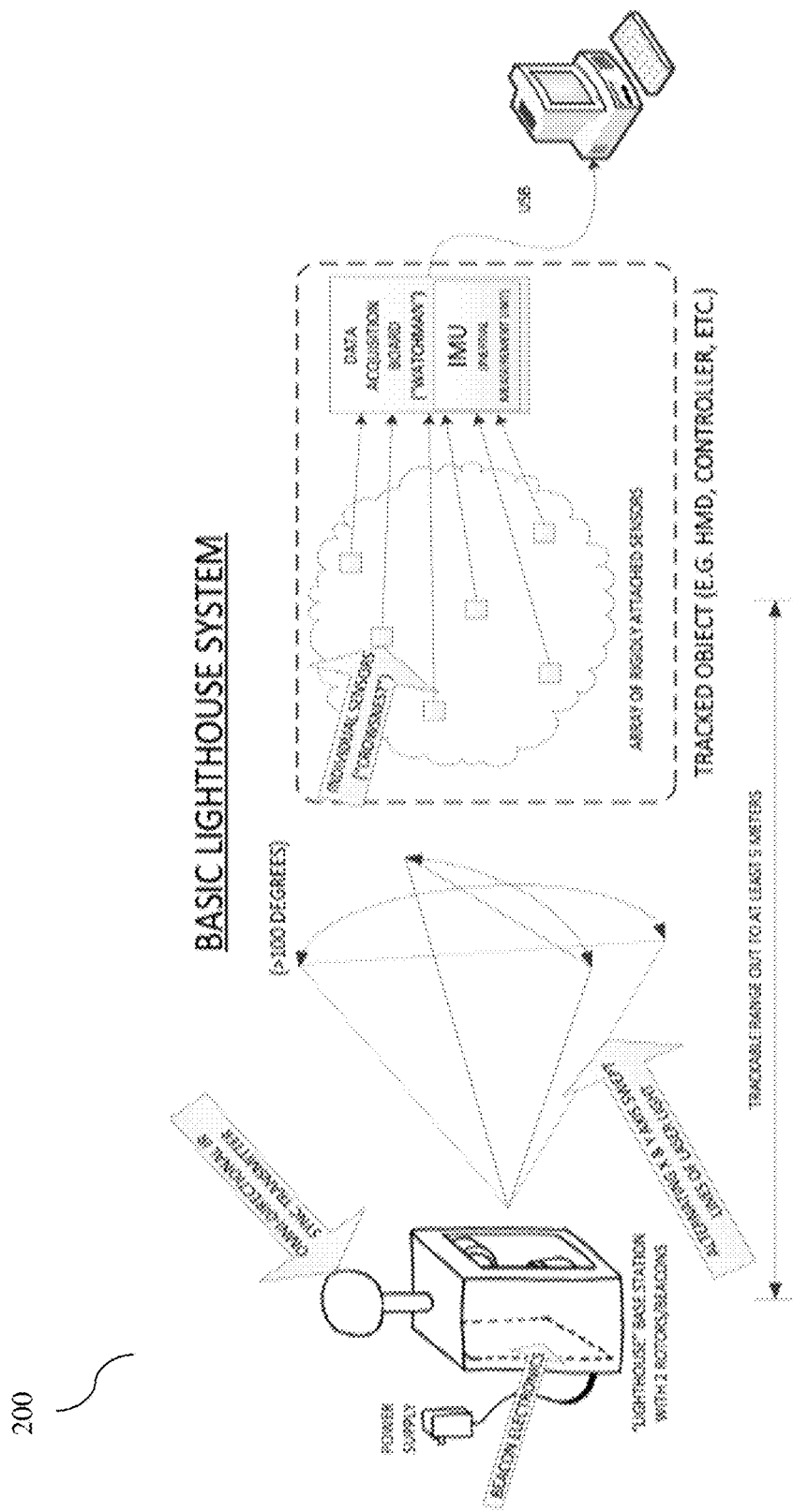
FIG. 2 is an exemplary diagram of a positional tracking system that may be used to implement aspects of certain embodiments of the present invention.

FIG. 2 is an exemplary diagram of a positional tracking system (200) that may be used to implement aspects of certain embodiments of the present invention.

Figure 3:
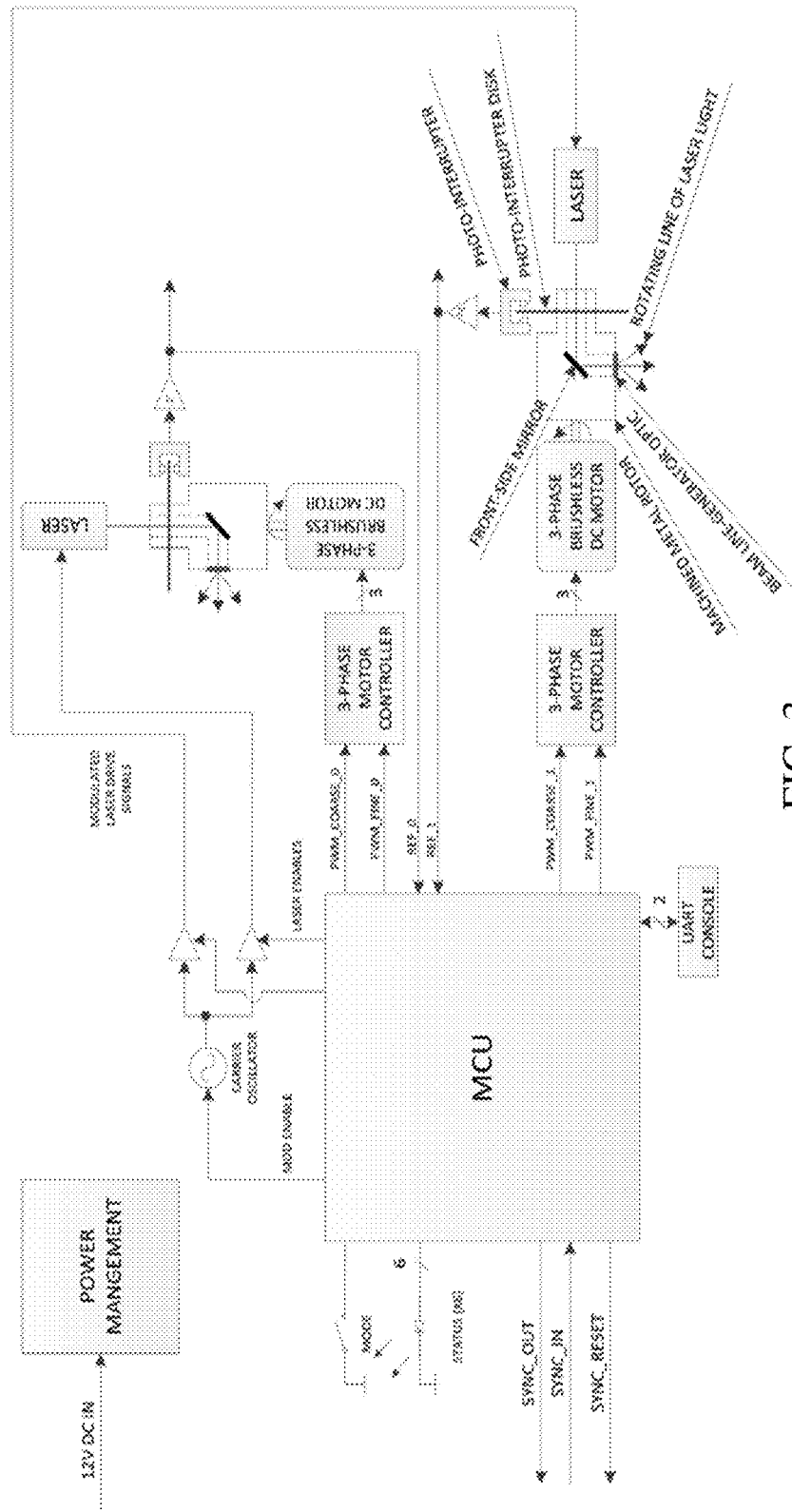
FIG. 3 is an exemplary diagram of base station hardware architecture of a positional tracking system that may be used to implement aspects of certain embodiments of the present invention.

FIG. 3 is an exemplary diagram of base station microcontroller-based ("MCU-based") hardware architecture (300) of a positional tracking system that may be used to implement aspects of certain embodiments of the present invention.

Figure 4:
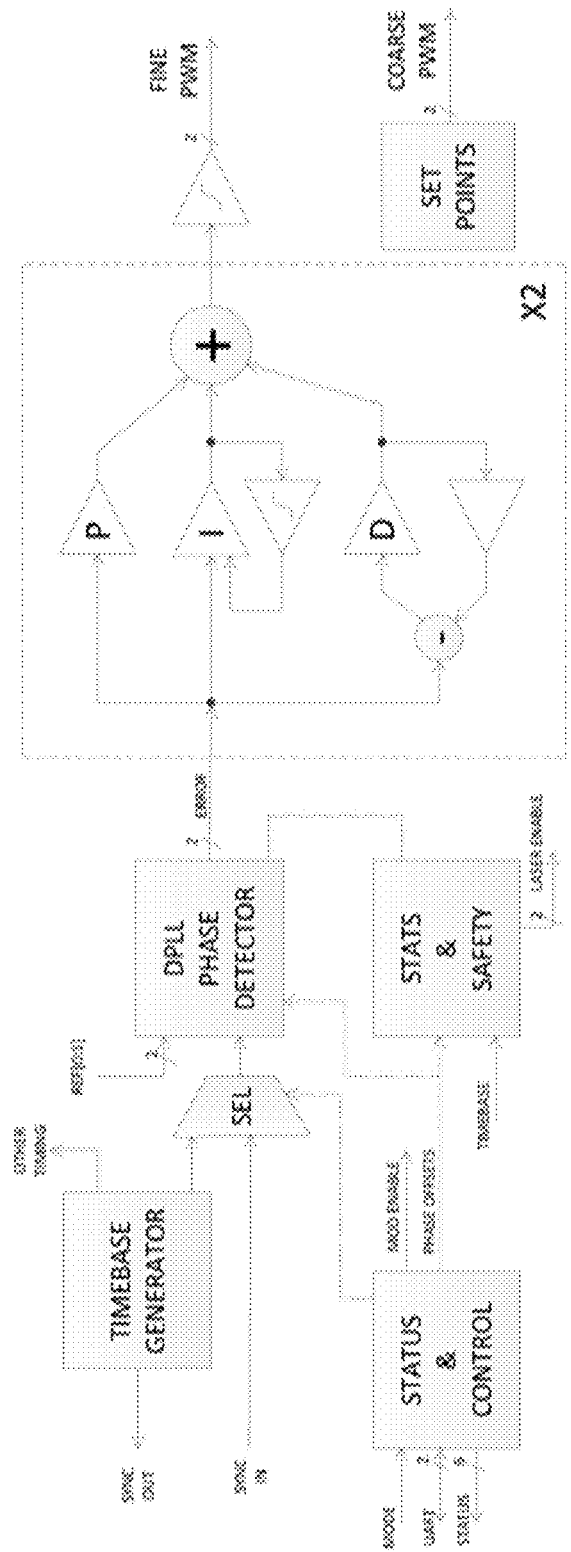
FIG. 4 is an exemplary diagram of base station firmware architecture of a positional tracking system that may be used to implement aspects of certain embodiments of the present invention.

FIG. 4 is an exemplary diagram of base station firmware architecture (400) of a positional tracking system that may be used to implement aspects of certain embodiments of the present invention.

Figure 5:
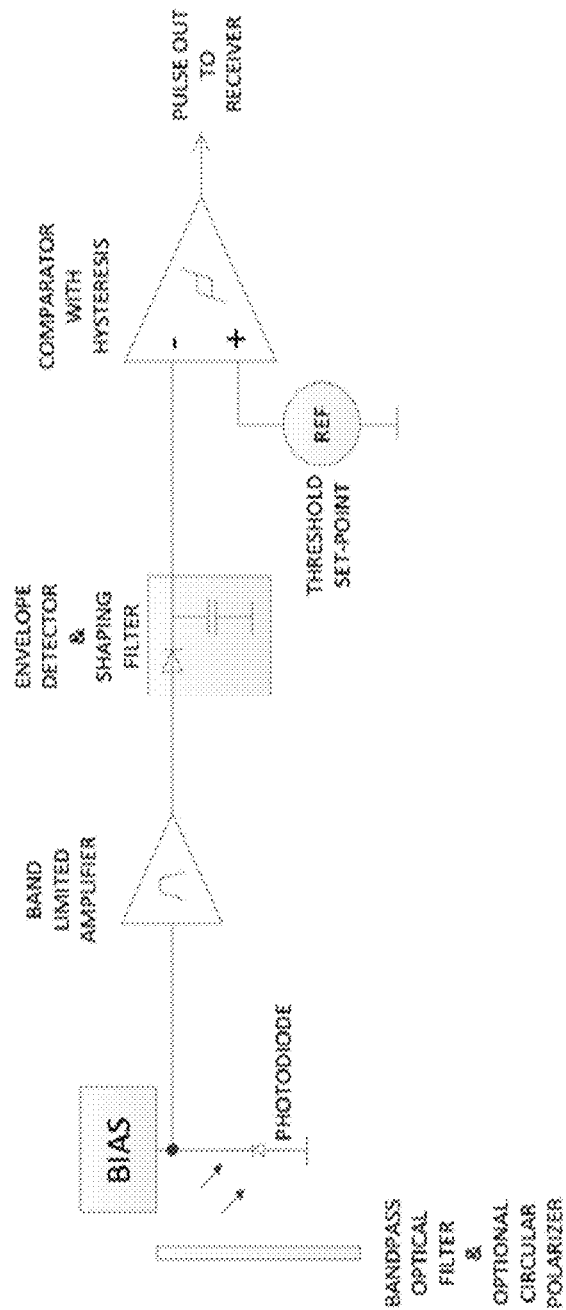
FIG. 5 is an exemplary diagram of a sensor architecture of a positional tracking system that may be used to implement aspects of certain embodiments of the present invention.

FIG. 5 is an exemplary diagram of a sensor architecture (500) of a positional tracking system that may be used to implement aspects of certain embodiments of the present invention.

Figure 6:
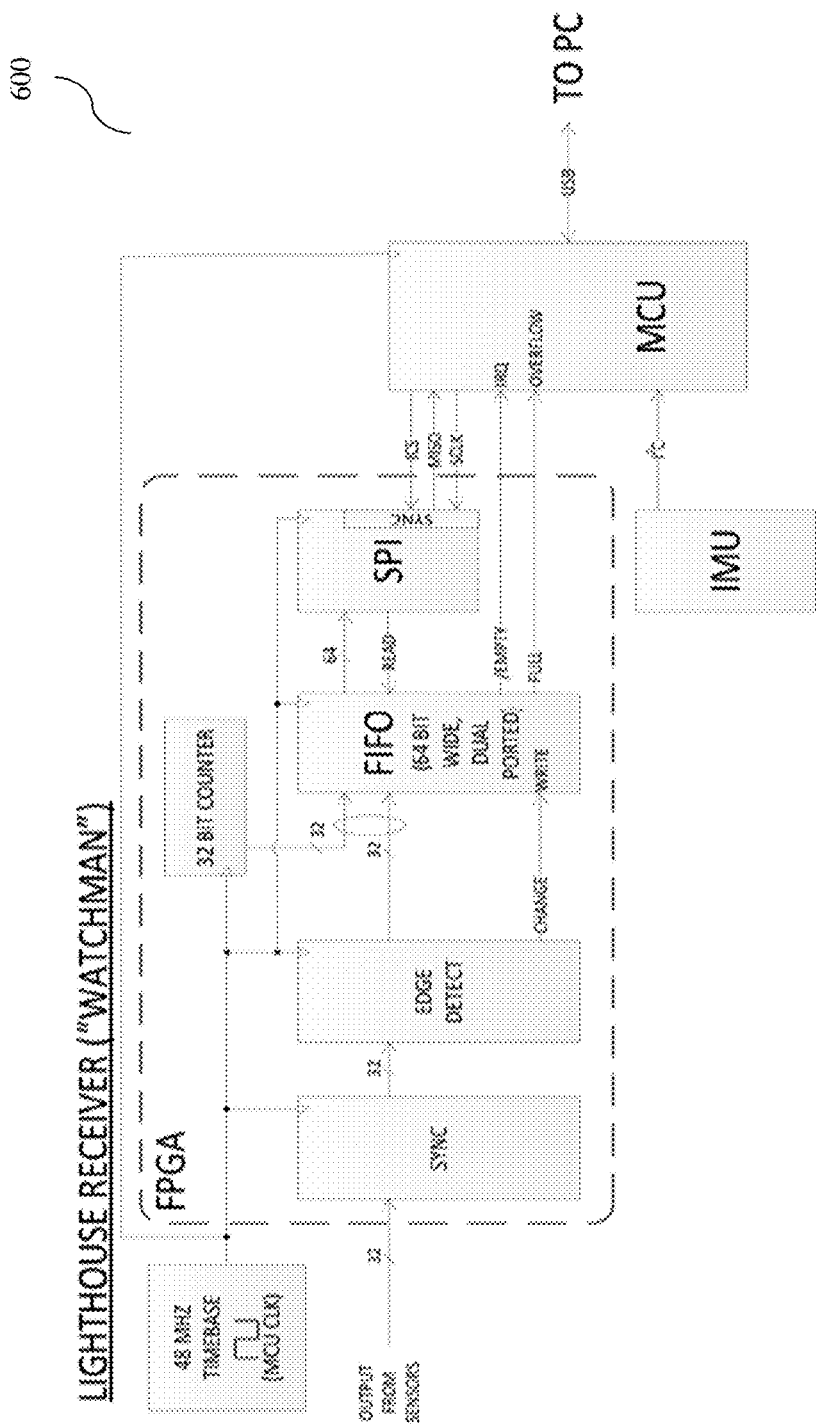
FIG. 6 is an exemplary diagram of a receiver architecture of a positional tracking system that may be used to implement aspects of certain embodiments of the present invention.

FIG. 6 is an exemplary diagram of a receiver architecture (600) of a positional tracking system that may be used to implement aspects of certain embodiments of the present invention.

Figure 7:
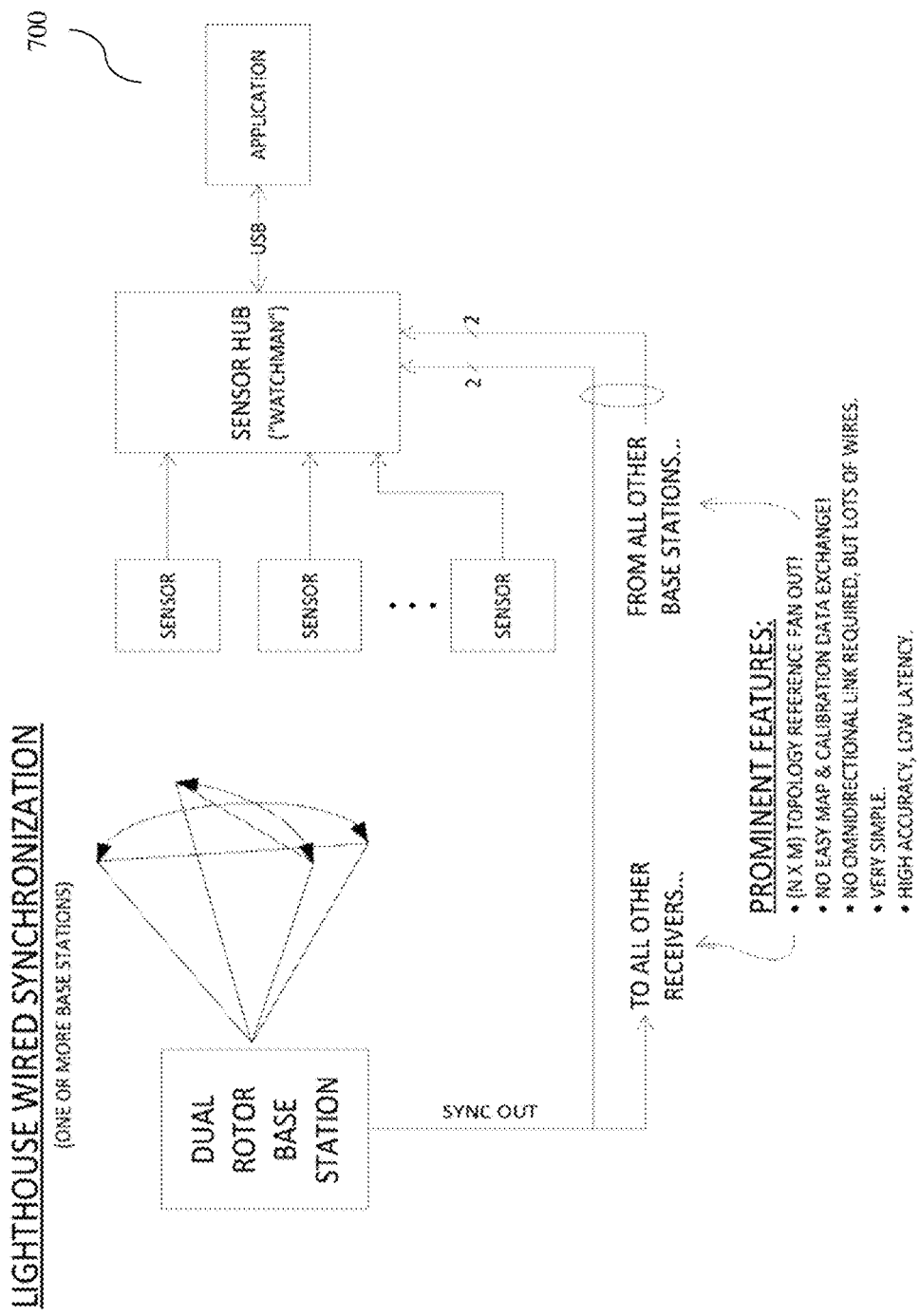
FIG. 7 is an exemplary diagram of a wired synchronization architecture in a positional tracking system that may be used to implement aspects of certain embodiments of the present invention.

FIG. 7 is an exemplary diagram of a wired synchronization architecture (700) in a positional tracking system that may be used to implement aspects of certain embodiments of the present invention.

Figure 8:
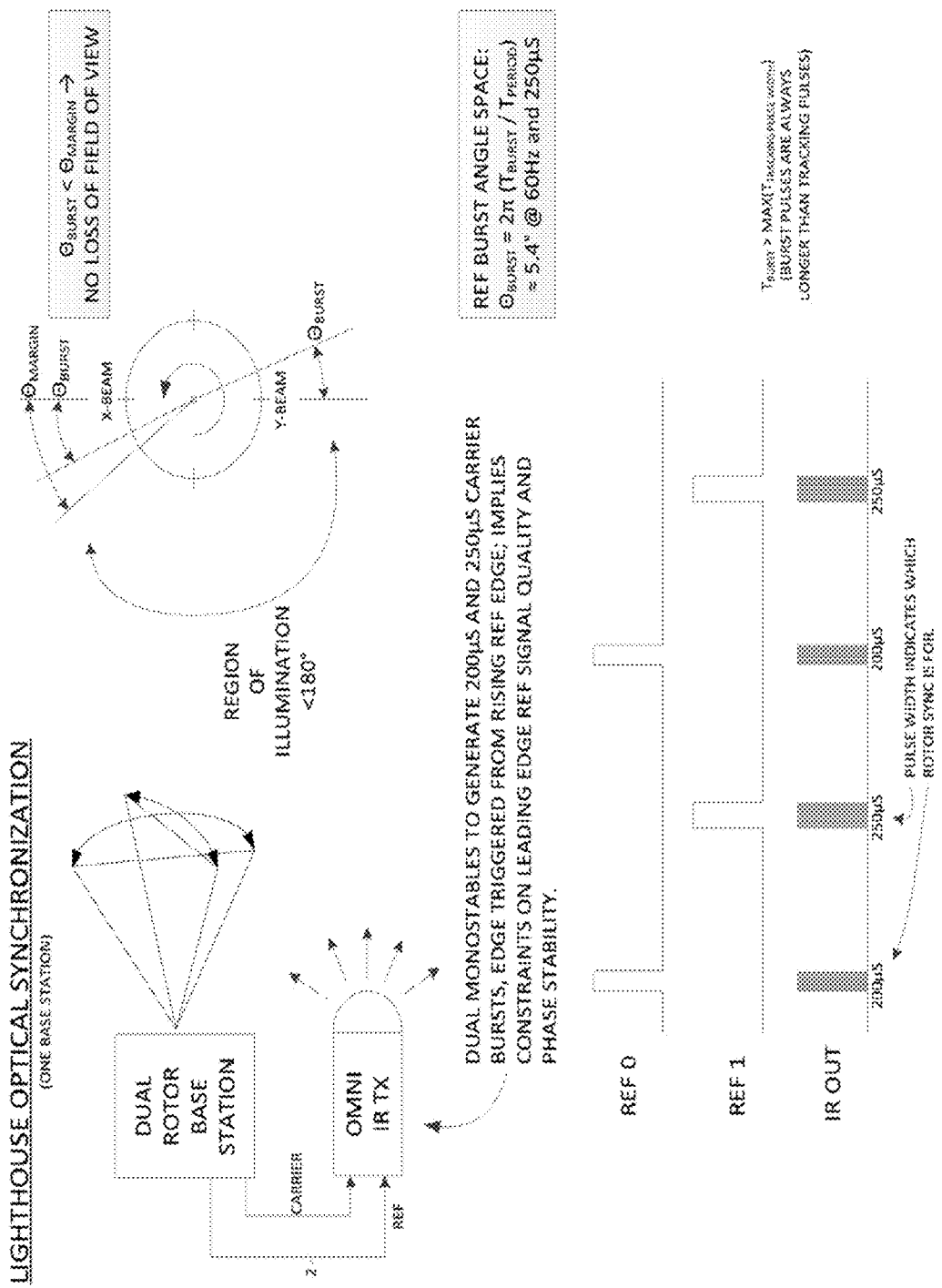
FIG. 8 is an exemplary diagram of an optical synchronization architecture in a positional tracking system that may be used to implement aspects of certain embodiments of the present invention.

FIG. 8 is an exemplary diagram of a single-base-station optical synchronization architecture (800) in a positional tracking system that may be used to implement aspects of certain embodiments of the present invention.

Figure 9:
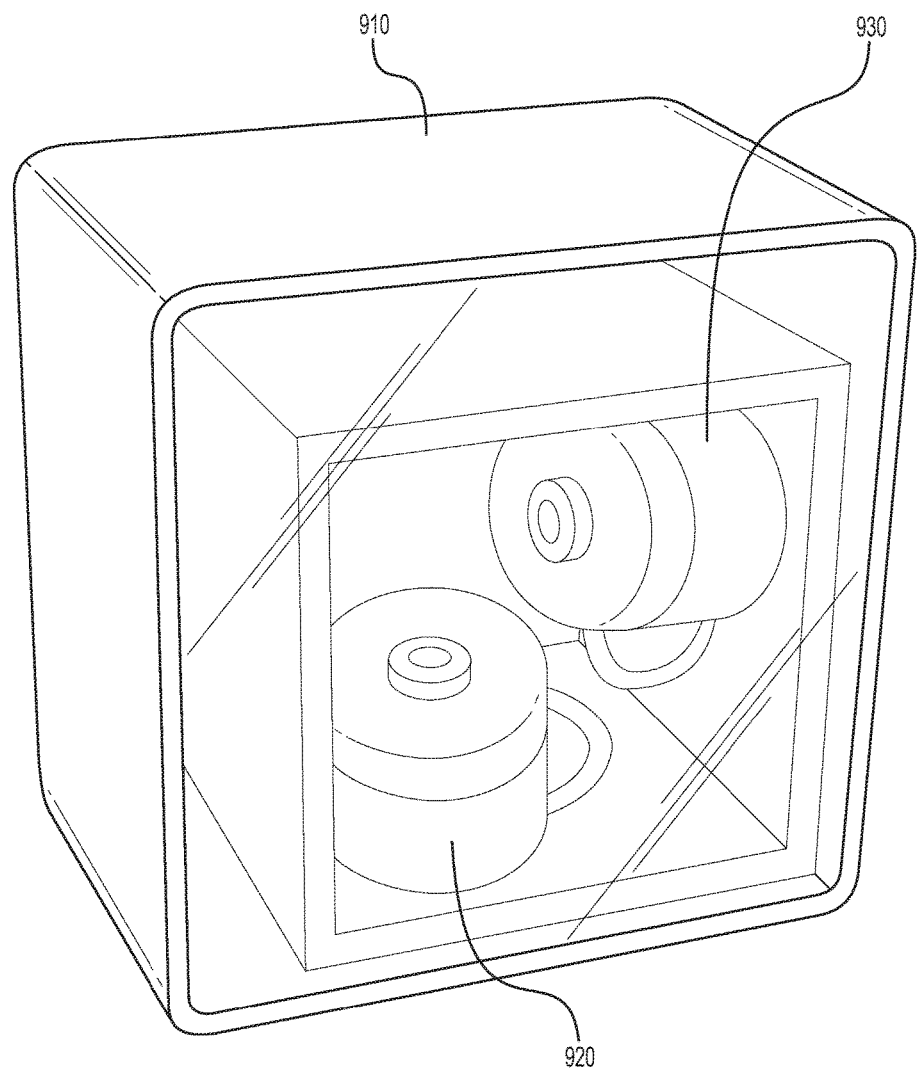
FIG. 9 is an exemplary diagram (front view) of an orthogonal dual-rotor optical transmitter that may be used to implement aspects of certain embodiments of the present invention.

FIG. 9 is an exemplary diagram (front view) of an orthogonal dual-rotor optical transmitter (910) that may be used to implement aspects of certain embodiments of the present invention. As shown in FIG. 9, transmitter (910) comprises a horizontal rotor (920) and a vertical rotor (930). Thus, each base station according to certain embodiments contains two rotors, which sweep a linear beam across the scene on orthogonal axes. At the start of each sweep cycle, the base station according to certain embodiments emits an omni-directional light pulse visible to all sensors. Thus each sensor computes a unique angular location in the swept volume by timing the duration between the sync signal and the beam signal. Sensor distance and orientation is solved using multiple sensors affixed to a single rigid body.

Certain embodiments of the present invention have a large field of view ("FOV") compared to camera-based optical tracking systems. A base station according to certain embodiments can radiate a near omnidirectional signal offering service in all directions, while a camera is limited by its optics to generally less than 90-120 degrees. This increased FOV allows embodiments of the present invention to maximize the useful tracking volume in a given space, and this is important for room-scale volumes. Also, because certain embodiments comprise spatial coding systems, they are relatively more scalable and broadcast signals which multiple users and objects can simultaneously use to compute their position and orientation.

The coded and/or spatially time-varying signal emitted by a rotor/beacon in a transmitter according to certain embodiments can be produced by various configurations. One such configuration is a single narrow line of light, swept radially around the rotor axis plane at a constant rate. This is implemented in certain embodiments with a rotating mirror and line generator optics, or a rotating line source. The radiation can in principle comprise any wavelength, but for the scale of typical systems visible or near-infrared light is preferable in certain embodiments.

The accuracy of systems according to embodiments of the present invention is dependent on the precision of the spatial modulation of the optical signal. It is relatively easy to measure small time scales with high precision, so the angular resolution is based upon measuring the detection time at the sensor of the light pulse from a rotor as its beam sweeps past the sensor. This time measurement is made relative to some reference time at the rotor transmitter when the direction of the beam is known. When combined with precision control of the rotating mirror angular velocity and rotational phase, relatively accurate measurements of relative angle can be taken.

Coherent light produced by laser diodes is preferred for the radiation beam source for a rotor according to certain embodiments because of its low divergence, brightness and capacity for rapid modulation. Among other implementations, incoherent light may also be used. Conventional light-emitting diodes ("LEDs") may also be used with somewhat more complicated optics, as skilled artisans will readily recognize.

Figure 10:
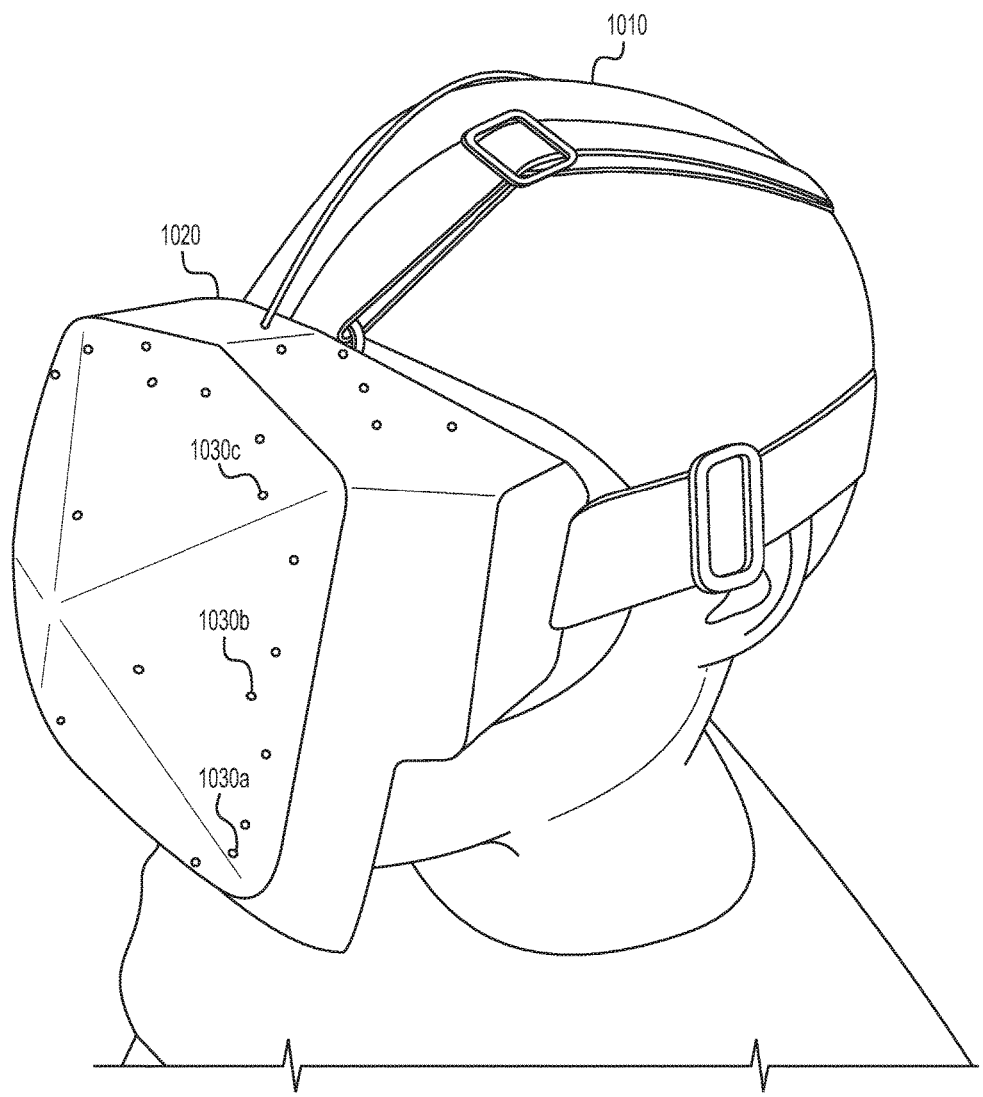
FIG. 10 is an exemplary diagram of a human user wearing a head-mounted virtual reality apparatus comprising optical receivers and sensors that may be used to implement aspects of certain embodiments of the present invention.

FIG. 10 is an exemplary diagram of a human user (1010) wearing a head-mounted virtual reality apparatus (1020) comprising optical receivers and sensors (1030a, 1030b, 1030c, etc.) that may be used to implement aspects of certain embodiments of the present invention.

Figure 11:
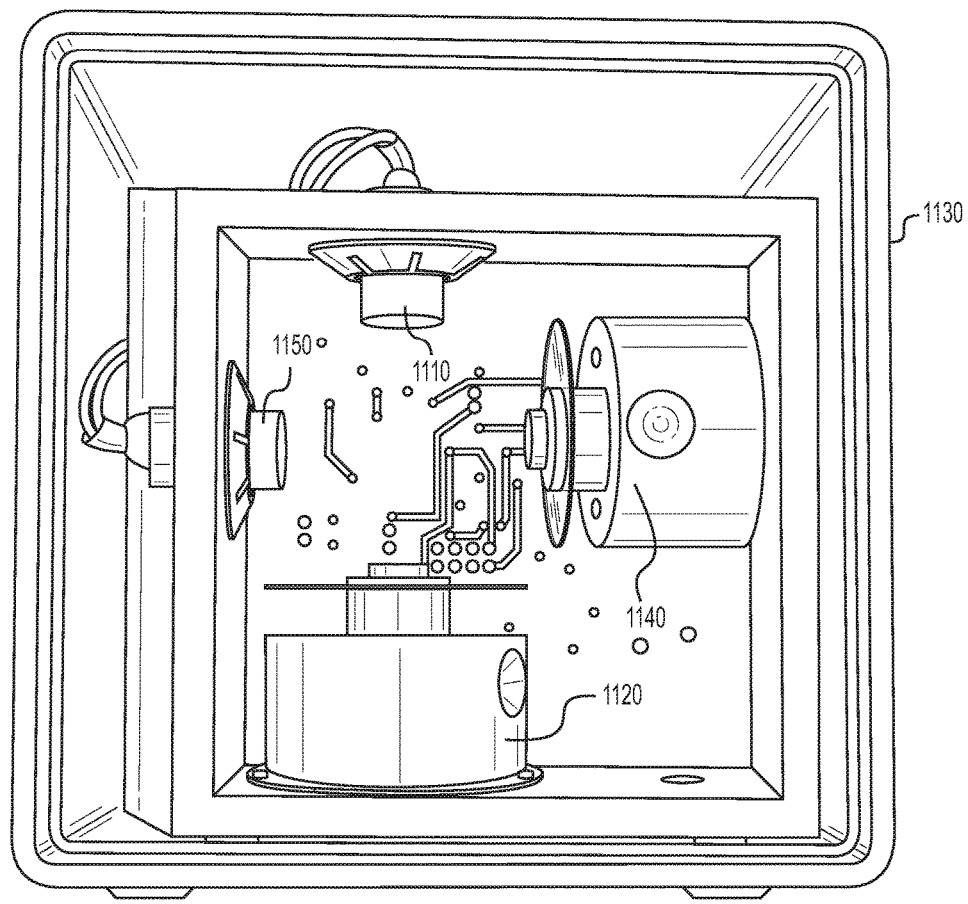
FIG. 11 is an exemplary diagram (front view) of an orthogonal dual-rotor optical transmitter that may be used to implement aspects of certain embodiments of the present invention.

FIG. 11 is an exemplary diagram (front view) of an orthogonal dual-rotor optical transmitter (1130) that may be used to implement aspects of certain embodiments of the present invention. As shown in FIG. 11, transmitter (1130) comprises a horizontal rotor (1120) and a vertical rotor (1140). Laser diodes (1110, 1150) or other suitable optical sources emit light into mirrors that are located within each of the spinning rotors (1120, 1140).

Figure 12:
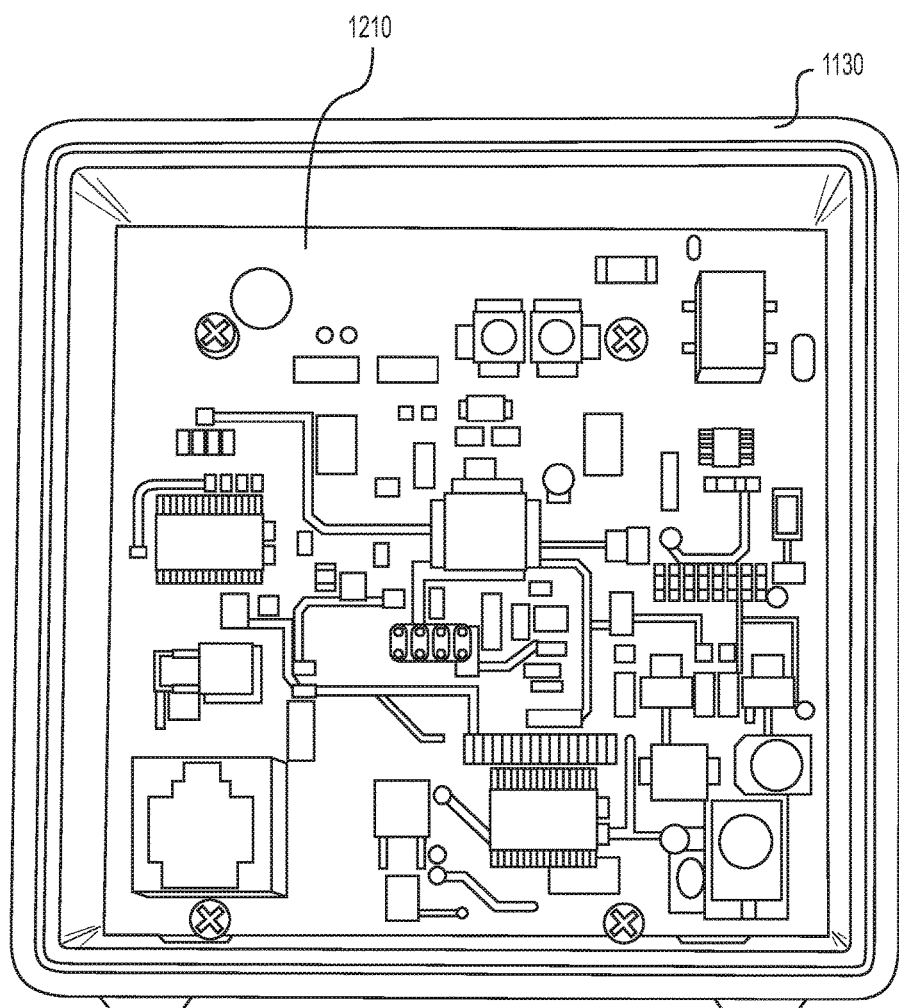
FIG. 12 is an exemplary diagram (rear view) of an orthogonal dual-rotor optical transmitter that may be used to implement aspects of certain embodiments of the present invention.

FIG. 12 is an exemplary diagram (rear view) of an orthogonal dual-rotor optical transmitter (1130) that may be used to implement aspects of certain embodiments of the present invention, showing the location and overall layout of base station electronics circuit board (1210), which is used to implement the functionality that is described throughout this document for certain embodiments.

Figure 13:
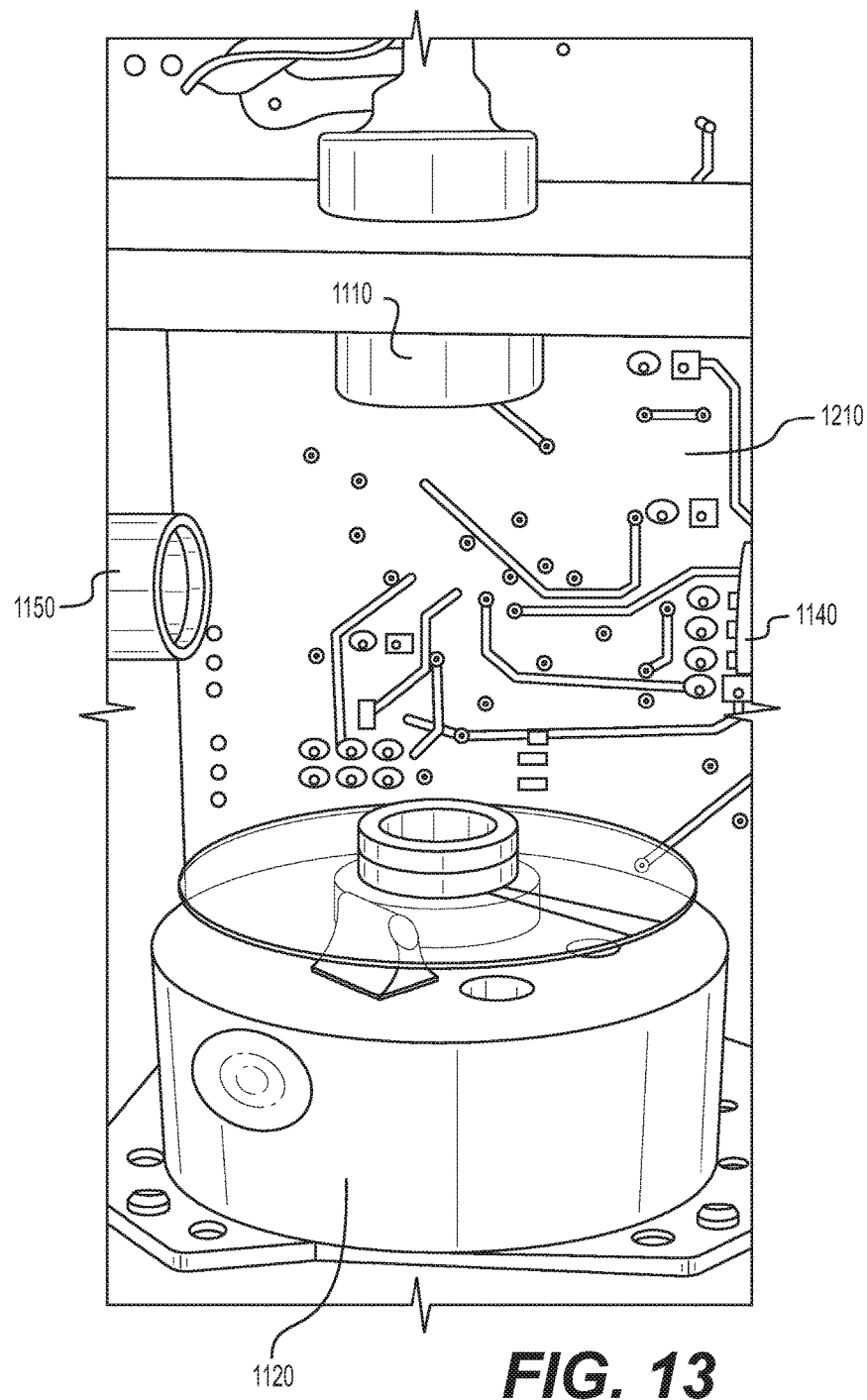
FIG. 13 is an exemplary diagram (front view) of details of an orthogonal dual-rotor optical transmitter may be used to implement aspects of certain embodiments of the present invention.

FIG. 13 is an exemplary diagram (front view) of details of an orthogonal dual-rotor optical transmitter may be used to implement aspects of certain embodiments of the present invention. The items depicted in FIG. 13 comprise a zoomed-in version of items that have been previously described in more detail with reference to FIGS. 11 and 12.

Figure 14:
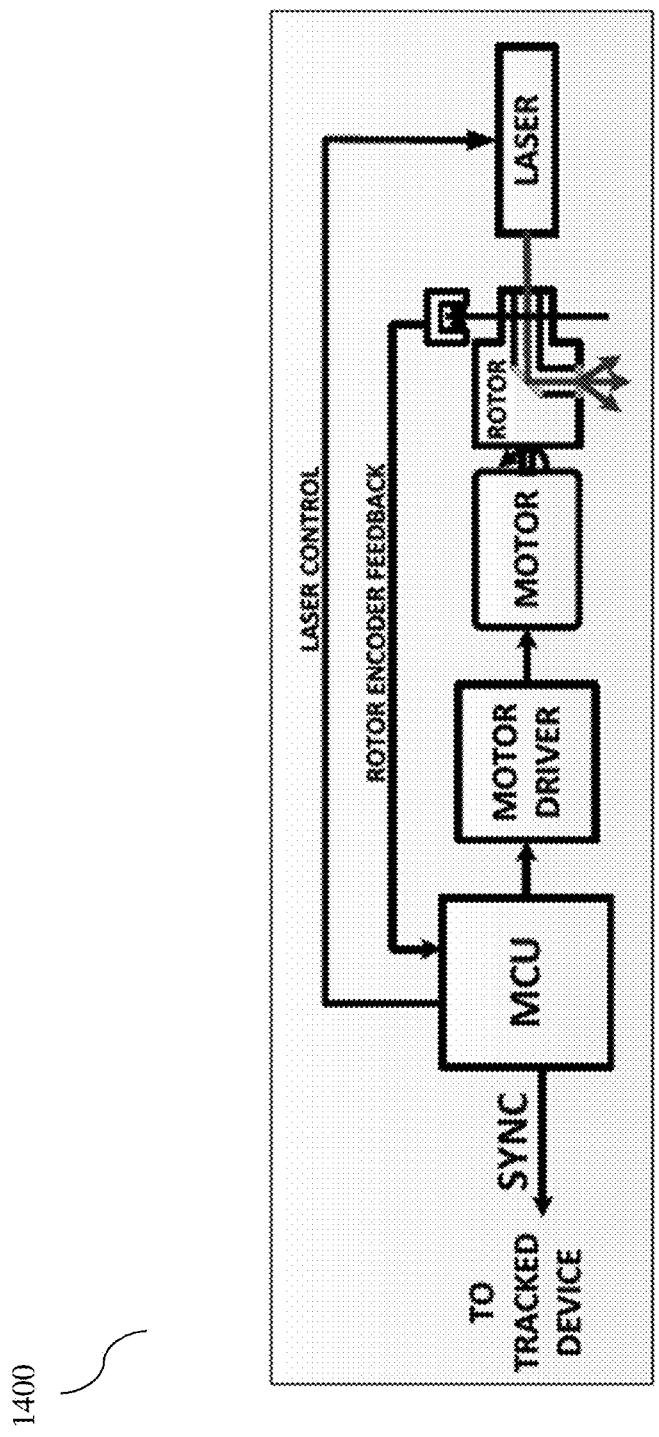
FIG. 14 is an exemplary block diagram of rotor/transmitter architecture details that may be used to implement aspects of certain embodiments of the present invention.

FIG. 14 is an exemplary block diagram of rotor/transmitter architecture details (1400) that may be used to implement aspects of certain embodiments of the present invention.

Figure 15:
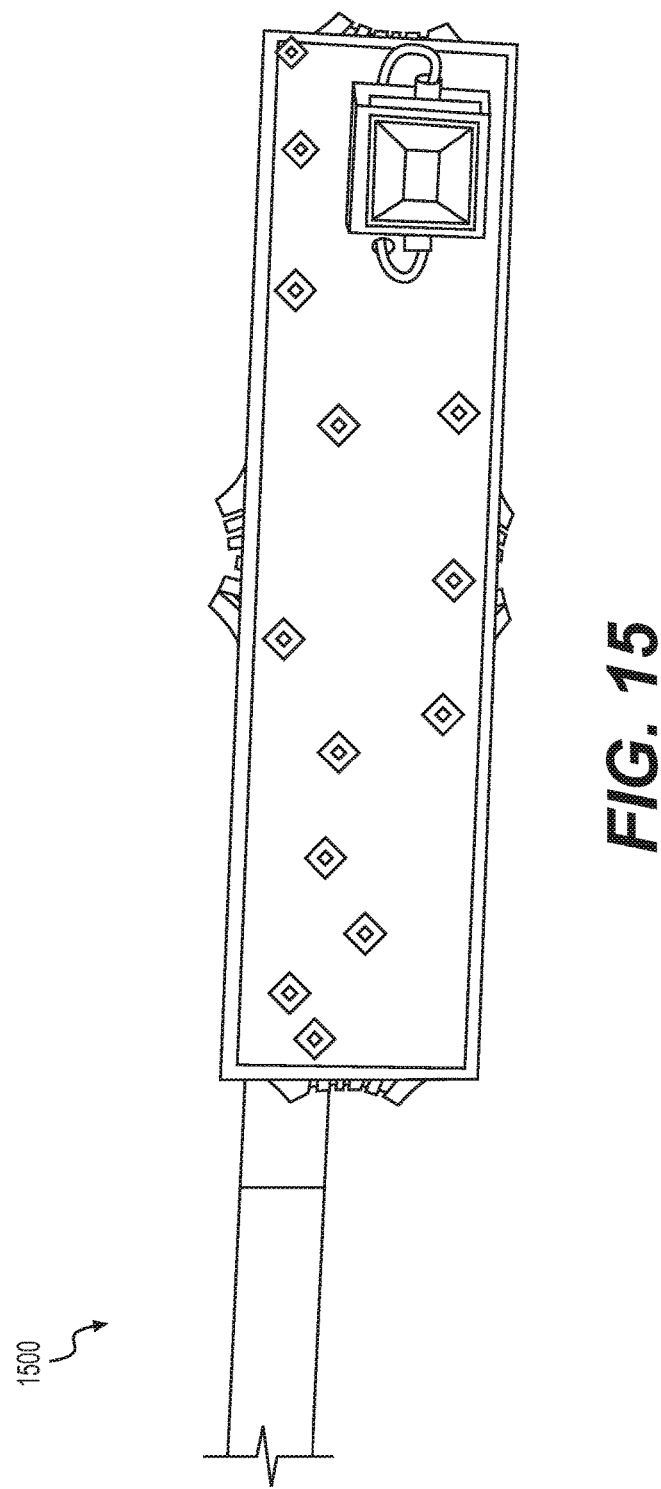
FIG. 15 is an exemplary diagram of a receiver (front view) that may be used to implement aspects of certain embodiments of the present invention.

FIG. 15 is an exemplary diagram of a receiver (front view) (1500) that may be used to implement aspects of certain embodiments of the present invention, and shows an exemplary front-side receiver circuit high-level board layout.

Figure 16:
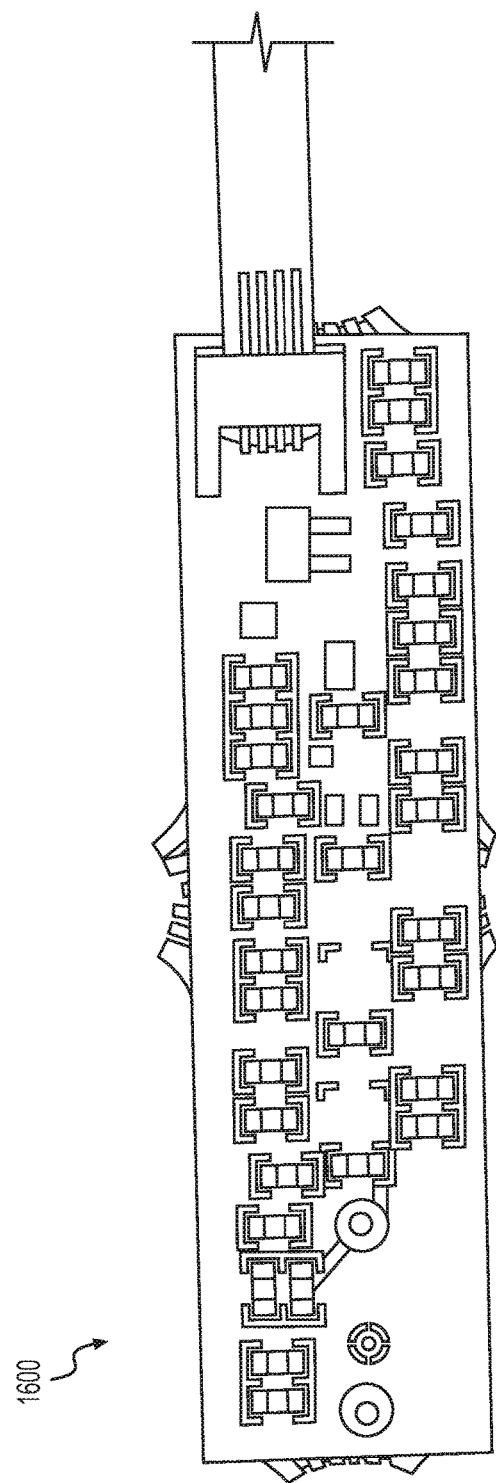
FIG. 16 is an exemplary diagram of a receiver (rear view) that may be used to implement aspects of certain embodiments of the present invention.

FIG. 16 is an exemplary diagram of a receiver (rear view) (1600) that may be used to implement aspects of certain embodiments of the present invention, and shows an exemplary rear-side receiver circuit high-level board layout.

Figure 17:
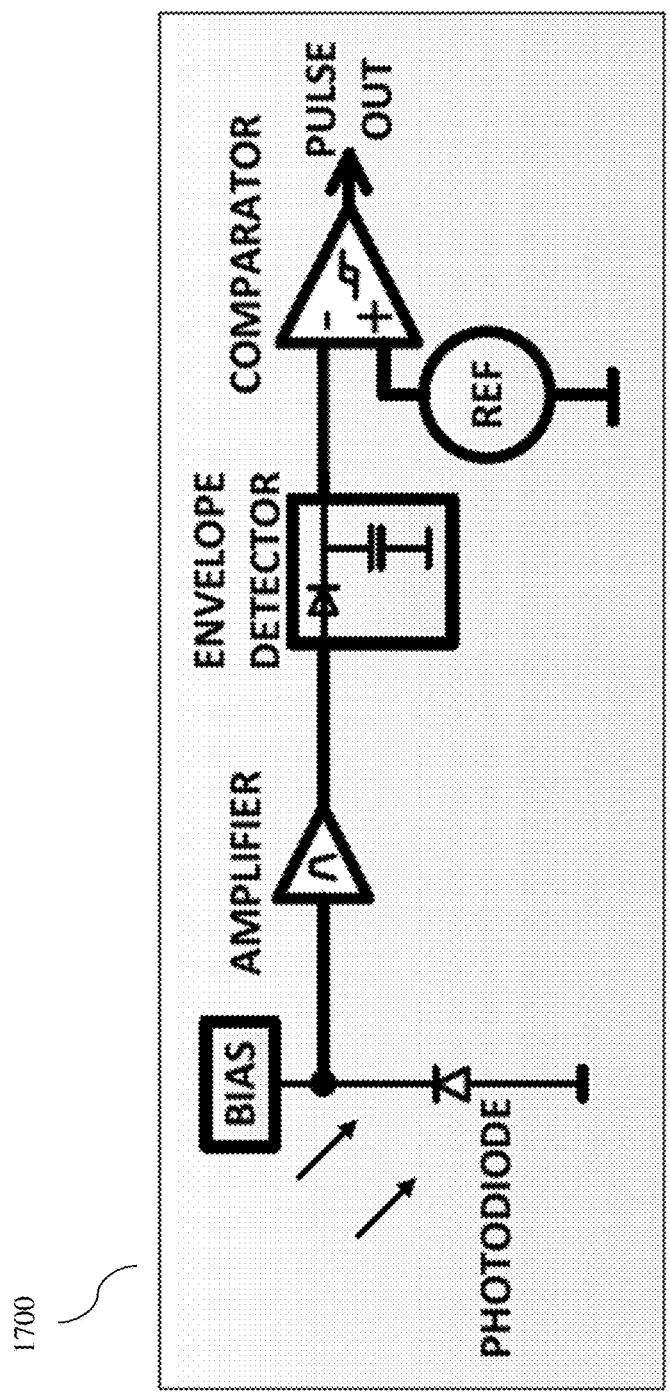
FIG. 17 is an exemplary block diagram of receiver architecture details that may be used to implement aspects of certain embodiments of the present invention.

FIG. 17 is an exemplary block diagram of receiver architecture details (1700) that may be used to implement aspects of certain embodiments of the present invention.

Figure 18:
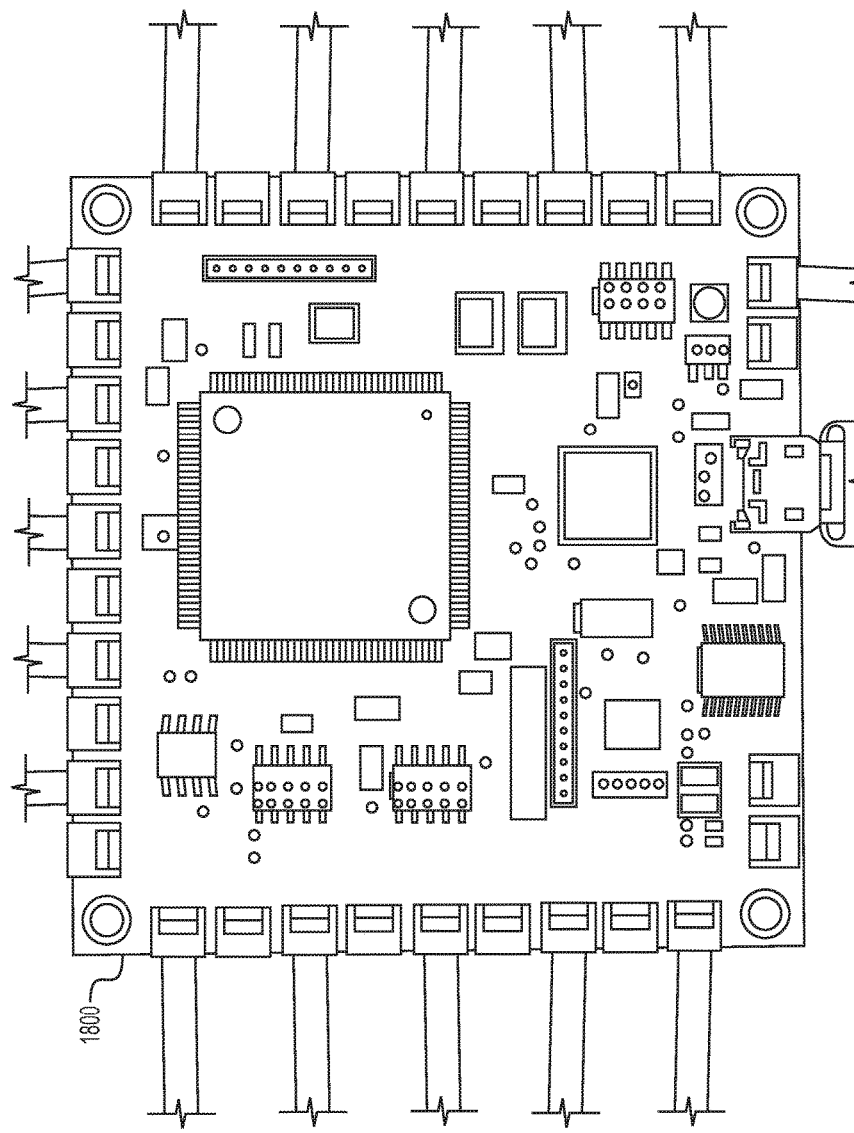
FIG. 18 is an exemplary diagram of a signal processor board that may be used to implement aspects of certain embodiments of the present invention.

FIG. 18 is an exemplary diagram of a signal processor board layout (1800) that may be used to implement aspects of certain embodiments of the present invention.

Figure 19:
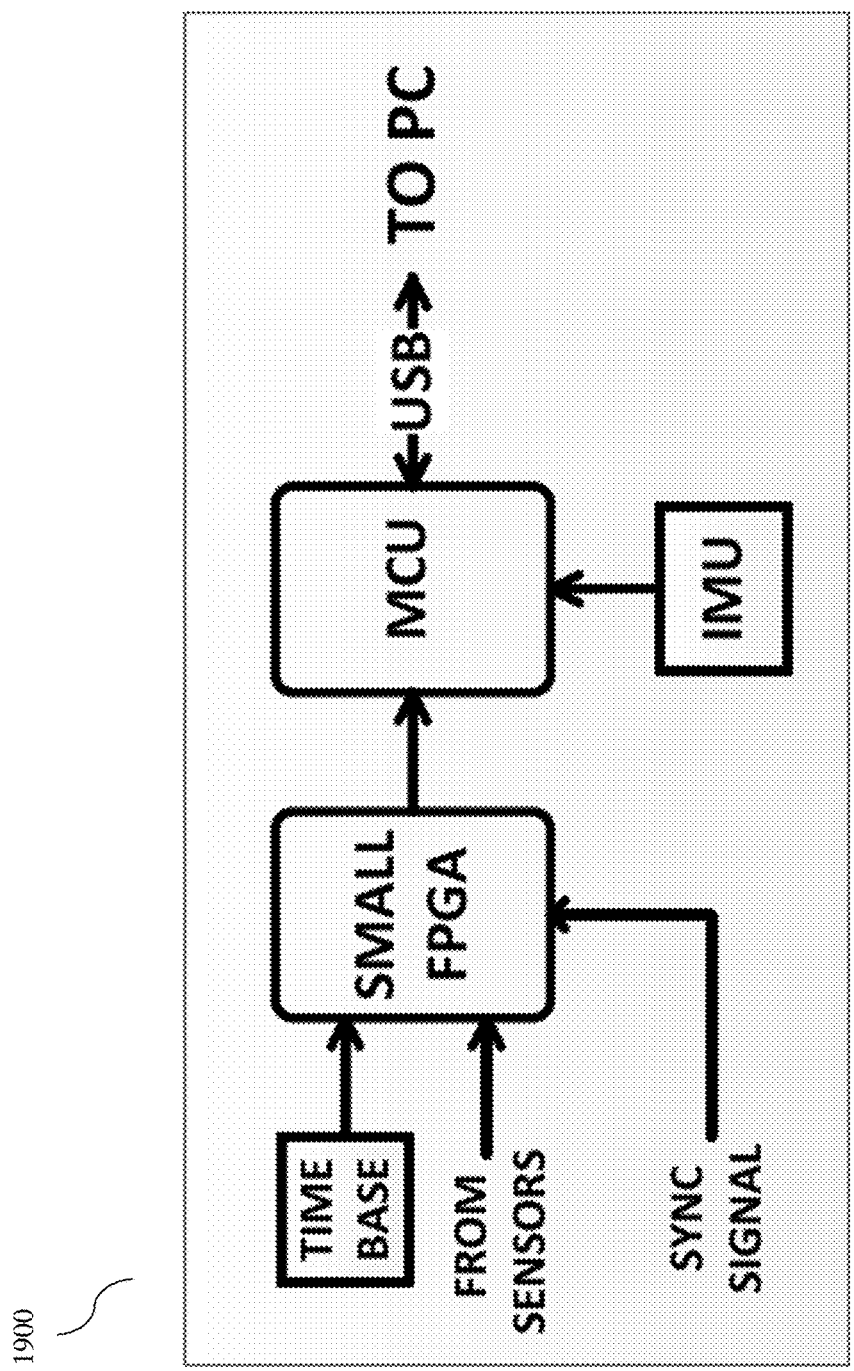
FIG. 19 is an exemplary block diagram of a signal processor architecture that may be used to implement aspects of certain embodiments of the present invention.

FIG. 19 is an exemplary block diagram of a signal processor architecture (1900) that may be used to implement aspects of certain embodiments of the present invention.

Figure 20:
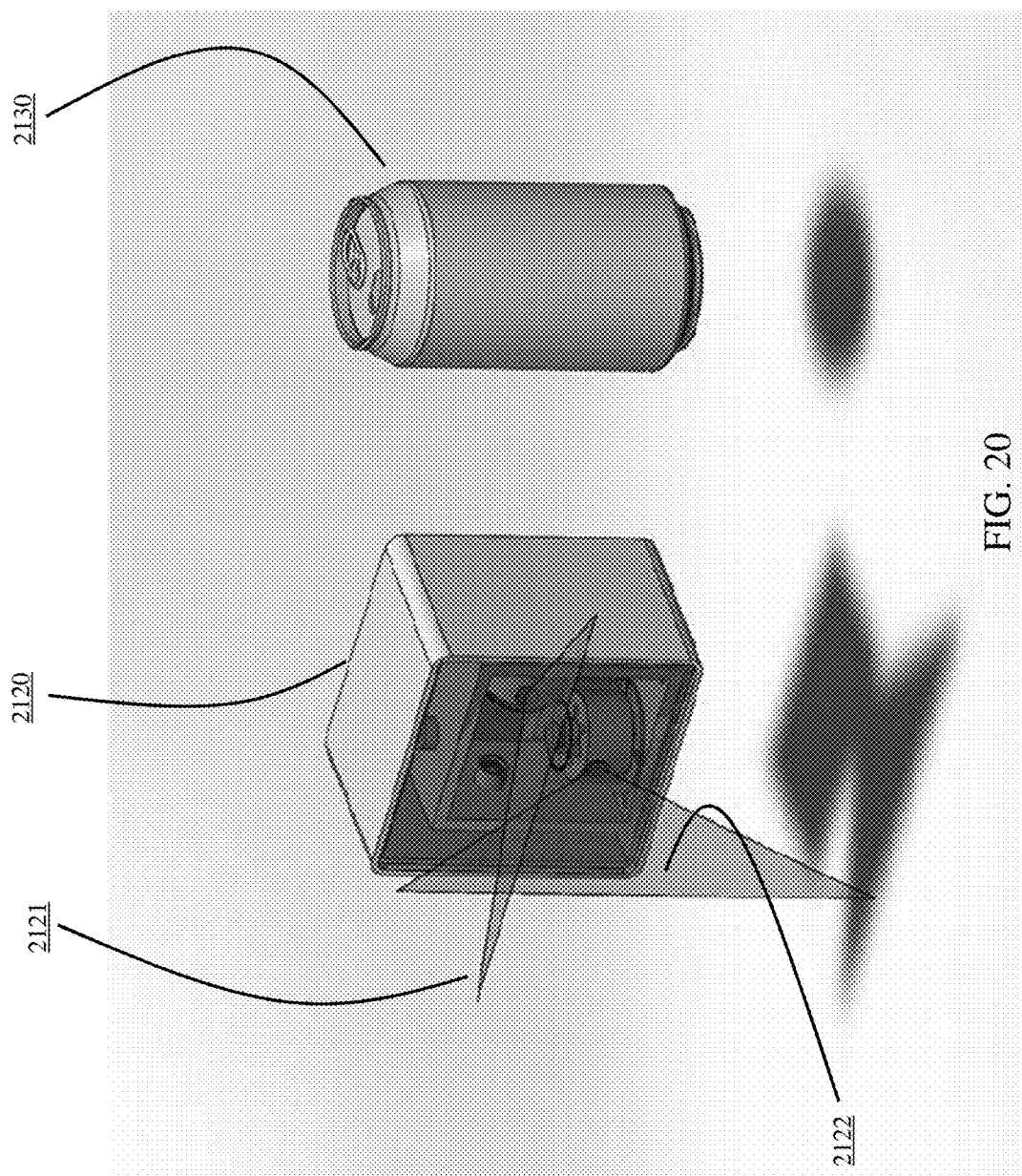
FIG. 20 is an exemplary diagram of an orthogonal dual-rotor optical transmitter that may be used to implement aspects of certain embodiments of the present invention, showing its relative size in comparison to a conventional 12-ounce drink can in an exemplary embodiment.

FIG. 20 is an exemplary diagram of an orthogonal dual-rotor optical transmitter (2120) that may be used to implement aspects of certain embodiments of the present invention, showing its relative size in comparison to a conventional 12-ounce drink can (2130) in an exemplary embodiment. FIG. 20 includes a conceptualized depiction of horizontal optical beam (2121) and vertical optical beam (2122) being emitted from the transmitter (2120). The timing and synchronization of the one or more optical beams that may be incorporated to implement aspects of the present invention depend on the specific requirements of each particular implementation.

Figure 21:
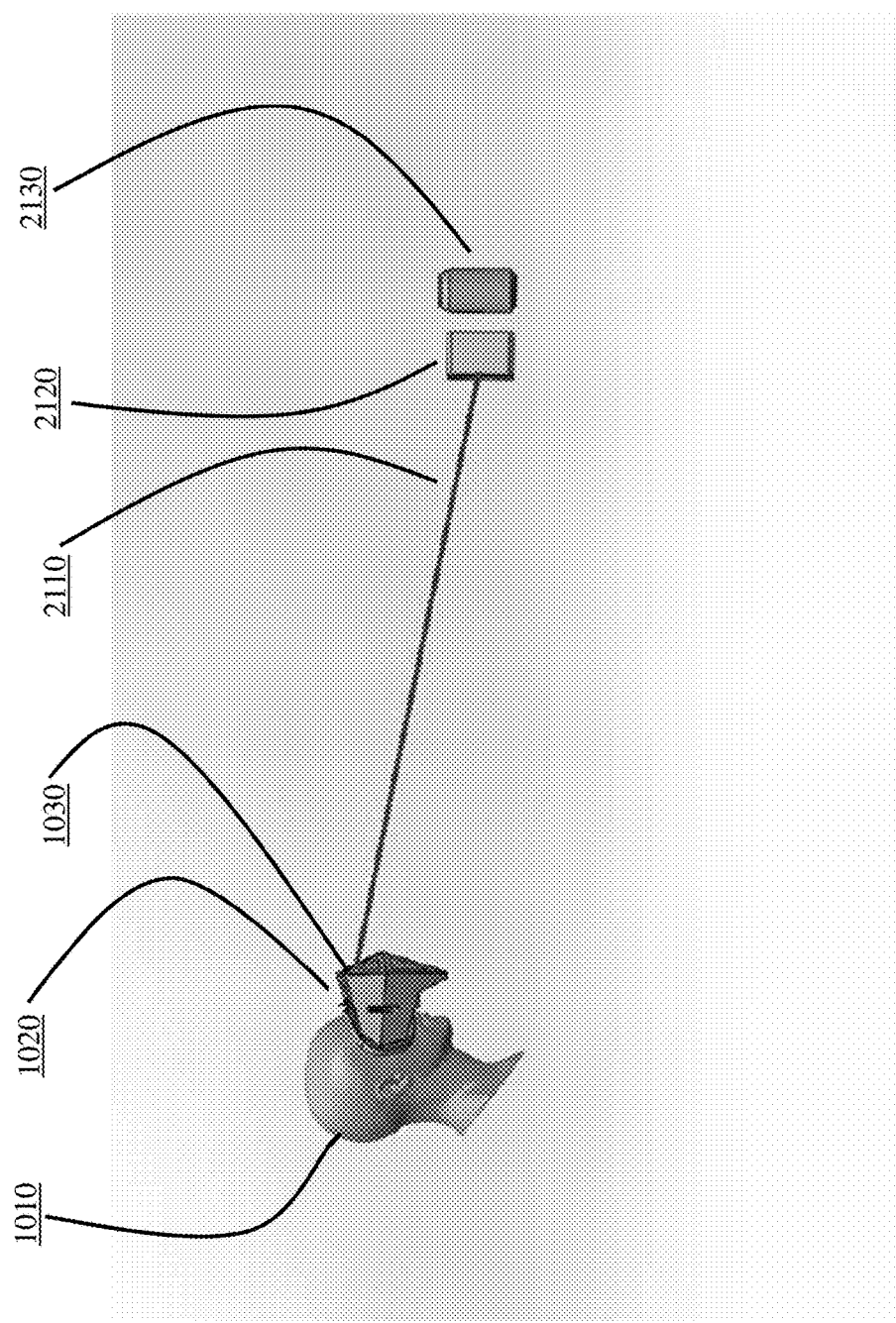
FIG. 21 is an exemplary diagram of a transmitter/receiver configuration in an optical positional tracking system that may be used to implement aspects of certain embodiments of the present invention.

FIG. 21 is an exemplary diagram of a transmitter/receiver configuration in an optical positional tracking system that may be used to implement aspects of certain embodiments of the present invention. As depicted in FIG. 21, an exemplary optical positional tracking system comprises a base station (2120) that sweeps an optical signal (2110) across the tracking volume. Depending on the requirements of each particular implementation, more than one base station may be incorporated, and each base station may generate more than one optical signal. For example, while a single base station is typically sufficient for six-degree-of-freedom tracking, multiple base stations may be necessary in some embodiments to provide robust room-scale tracking for headsets and peripherals. Optical receivers (e.g., 1030) are incorporated into the head-mounted virtual reality apparatus (1020) or other tracked objects. In certain embodiments, optical receivers are paired with an accelerometer and gyroscope Inertial Measurement Unit ("IMU") on each tracked device to support low-latency sensor fusion. As shown in FIG. 21, a standard 12-ounce soda or beer can (2130) is depicted to provide a sense of scale.

Each base station (2120) according to certain embodiments contains two rotors, which sweep a linear beam (2110) across the scene on orthogonal axes. At the start of each sweep cycle, the base station (2120) according to certain embodiments emits an omni-directional light pulse ("sync signal") visible to all sensors. Thus, each sensor computes a unique angular location in the swept volume by timing the duration between the sync signal and the beam signal. Sensor distance and orientation is solved using multiple sensors affixed to a single rigid body.

Figure 22:
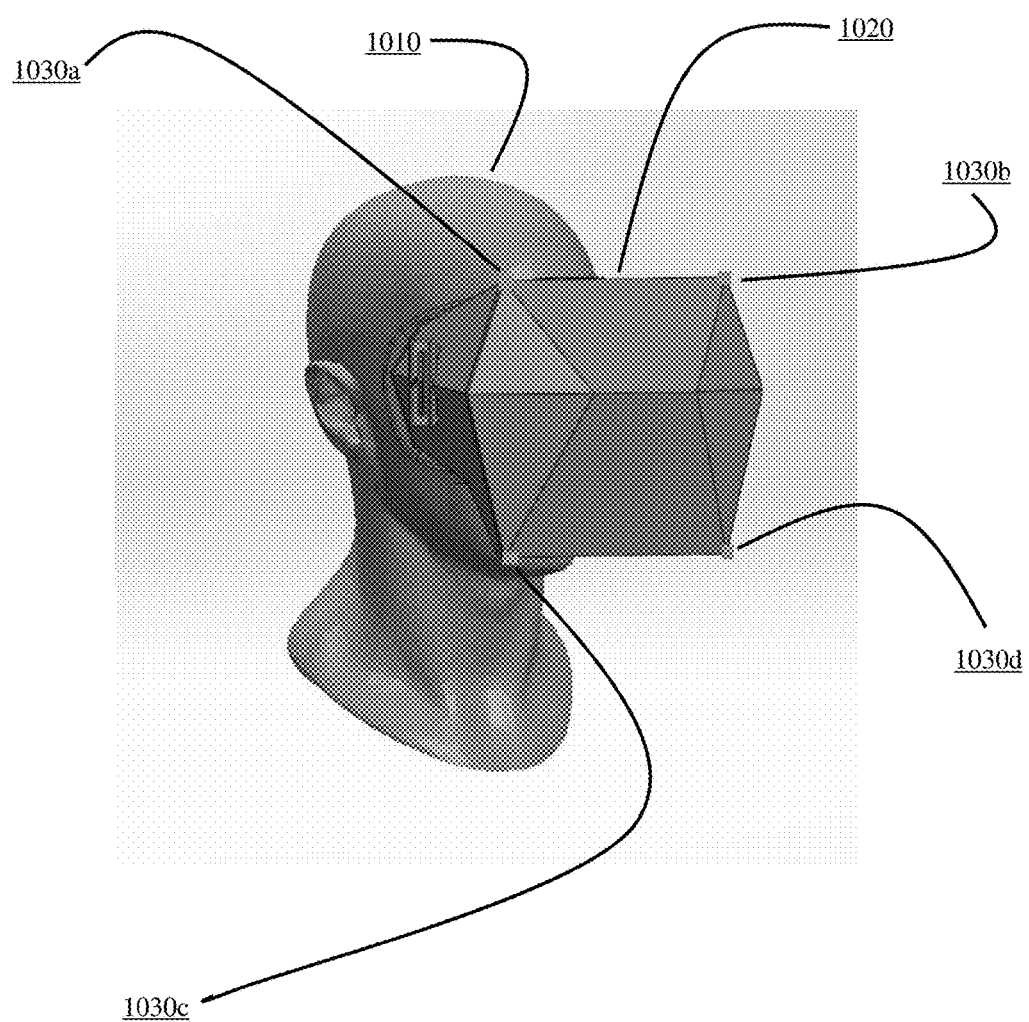
FIG. 22 is an exemplary diagram of a head-mounted virtual reality display with four optical receivers that may be used to implement aspects of certain embodiments of the present invention.

FIG. 22 is an exemplary diagram of a head-mounted virtual reality display (1020) with four optical receivers (1030a, 1030b, 1030c, 1030d) that may be used to implement aspects of certain embodiments of the present invention.

A sensor according to certain embodiments comprises an optoelectronic device capable of detecting the modulated light from the rotor. For visible or near-infrared ("NIR") light, silicon photodiodes and suitable amplifier/detector circuitry are preferred in certain embodiments. Because the environment may contain static and time-varying signals with similar wavelengths to the base station signals (optical noise) it is helpful to modulate the base station light in such a way as to make it easy to differentiate from any interfering signals, and/or to filter the sensor from any wavelength of radiation other than that of base station signals.

In certain embodiments it is assumed that the illuminated volume will be largely free of reflecting objects and surfaces. Reflections can cause spurious signals for the sensor system. The effect of first-order reflections can be reduced or eliminated in certain embodiments by using a circularly polarized radiation source at the base station and suitable matched circular polarizing filters at the sensors.

One simple sensor implementation according to certain embodiments is a photodiode, an amplifier, a discrete envelope detector and a fast comparator with a relatively small amount of hysteresis. See, for example, FIGS. 5 and 17. This implementation delivers a digital pulse to the down-stream receiver circuit whenever the beam from the base station sweeps past the sensor.

A receiver according to certain embodiments is the signal processing system which takes the signals from the sensors and timing reference data from the base stations, and uses an internal high-precision clock to timestamp the signal transitions. This timing data is combined with inertial signals from the IMU, and sent over a suitable interface bus (e.g., universal serial bus, or USB) or via a wireless link to the host computer so that the base station/sensor bearing angle information can be extracted and utilized to determine position and orientation of the sensor/receiver assembly. See, for example, FIGS. 6 and 19.

In certain embodiments, optical pulses seen at the sensors and decoded by the receiver can only be utilized for bearing determination if the receiver also knows the absolute phase of the rotors in the system. To maintain synchronization between the base station transmitters and the receivers many mechanisms may be used, depending upon the requirements of each particular implementation.

One such mechanism according to certain embodiments comprises wires coupling the base station transmitters and the receivers. See, for example, FIG. 7. This exemplary synchronization mechanism is relatively easy to implement because each rotor already has an absolute phase reference detector used to control the position of the rotors with respect to the transmitting timebase. However, this mechanism is relatively less scalable because the reference signals from each rotor must be fanned out to each receiver in the system (i.e., utilizing an "n by m" wiring topology, where "n" represents the number of rotors and "m" represents the number of receivers). Even with synchronized base station transmitters, small variations in the phase of the rotors typically cannot be fully corrected by the control loops, so the true absolute phase wander of each individual rotor should be communicated to the receivers. Simply communicating the timebase clock with one wire will result in a loss of quality of service in certain embodiments, although this may be acceptable for some applications.

Another exemplary synchronization mechanism implementation communicates the synchronization information to the receivers wirelessly. See, for example, FIG. 8. Because the receiver according to certain embodiments already comprises multiple optical sensors, these sensors can be utilized for synchronization without additional hardware (e.g., without an RF receiver/transceiver). A basic width-coded omni-directional broadcasting carrier-pulse-train flash system is suitable for single-base station systems in certain embodiments. The reference signals from a base station in certain embodiments can directly trigger synchronization bursts (at absolute rotor phases) and the receiver can determine which rotor reference is indicated via observation of the pulse width. This implementation is not much more complicated than wired-synchronization implementations, and suffers some of the same limitations in certain embodiments. For example, this implementation cannot communicate the absolute phase of more than two rotors in certain embodiments, and it typically cannot communicate any additional information, at least not at relatively large data rates.

In multiple-base-station systems according to certain embodiments, the absolute phase of each rotor is communicated to the receiver to correct for rotor phase wander/noise, as well as the configuration of the base stations with respect to the tracking coordinate system, and calibration data modeling the non-ideal aspects of the beacon functionality.

Certain embodiments comprise base stations containing two rotating mirror rotors, mounted orthogonally in one casing. The mirrors are driven by 3-phase variable frequency brushless DC motors with optical position detection controlled by precision phase-locked loops implemented in a microcontroller. The microcontroller also manages the laser enable signals. The lasers are amplitude modulated at several MHz to allow the sensors to reject any signals other than those from the base stations. Each base station contains a precision clock to which each rotor's angular frequency is locked. Two rotors scan 180 degrees out of phase, illuminating the area of tracking alternately.

The photo-sensors according to certain embodiments comprise medium-area silicon photodiodes, the output signal of which is amplified by discrete bipolar junction transmitter ("BJT") amplifiers. According to certain embodiments, the signal seen at a receiver as a rotor beam sweeps past it is a Gaussian burst of sub-carrier RF modulation. This RF pulse train is envelope-detected, shaped and run through a level comparator to extract a pulse spanning the time the sensor was illuminated by the beam. The circuit is carefully designed such that the edge positions accurately represent the passage of the beam, regardless of the orientation of the sensor with respect to the beam source.

The receiver according to certain embodiments comprises a high-speed digital logger which accurately timestamps the edges coming from the sensor channels and reference signals originating at the base stations. It is implemented using a small field-programmable gate array ("FPGA") and a microcontroller. The microcontroller manages the high-speed FPGA front-end and the inertial unit and packages the data stream for delivery back to a host computer over a suitable interface bus (e.g. USB) for processing.

In certain embodiments, various parts of the system have a relatively large impact on the system's performance. While most parts of the system may comprise commercially-available commodity parts with no particular precision in of themselves, they are carefully assembled so that together they achieve high performance relative to system cost.

In certain embodiments, the base station transmitters contain the most precision parts. The rotating mirror and line generator optic assembly according to certain embodiments comprise a custom-machined part, made relatively heavy with a large moment of inertia so as to facilitate precision scanning speed control. The line generator optics in certain embodiments comprises an injection-molded polymer part but achieves one-milliradian ("1 mrad") divergence and a 120-degree fan angle. The diverter mirror according to certain embodiments comprises a first surface mirror, but exhibiting relatively low surface quality (i.e., several wavelengths). The rotor assembly according to certain embodiments is driven by off-the-shelf hard-disk spindle motors, which have relatively high mechanical precision. The optical rotor position-sensing system according to certain embodiments comprises a conventional slot-interrupter sensor. The repeatability of this position-sensing system is improved in certain embodiments by careful design of the analog signal processing before digital processing in the microcontroller. The polyphase motor drivers in certain embodiments are selected for excellent performance, but may comprise conventional parts. The laser diodes in certain embodiments comprise moderate power (e.g. 150 mW) but need not exhibit especially high performance, and may comprise off-the-shelf optics.

The receiver according to certain embodiments may be implemented with standard catalog-item parts. The sensors in certain embodiments may also be implemented with widely available off-the-shelf parts. The sensor photodiode in certain embodiments is selected for good sensitivity and off-axis performance. The IMU in certain embodiments may be implemented as a common but reasonably high-quality unit, typical of the kinds of micro-electromechanical system ("MEMS") IMU device used in cellular telephones.

While a single base station can be utilized for tracking, using multiple base stations is preferred in certain embodiments, especially in multi-user scenarios. Synchronizing base stations together simplifies the tracking calculations in certain embodiments. One synchronization solution comprises wired synchronizing signals, but a wireless solution may be more desirable in certain embodiments. An omnidirectional optical signal comprises one such available solution.

Depending on the requirements of each particular implementation, as has already been described, base station reference signals may be delivered to tracking receivers via cabling, or synchronization and reference data delivery may be delivered wirelessly.

Disambiguation of beacon signals at the receiver may be effected, depending on the requirements of each particular implementation, for example, by base stations that use different optical wavelengths, different amplitude modulation frequencies, and/or different general amplitude/phase modulation (including base station ID transmission and current rotor phase information in the optical signal).

Using optical communication may require the sensors to be relatively more complex, separating not only the envelope of the optical subcarrier pulses for tracking purposes, but also emitting a data-sliced digital stream which the receiver can use to recover the data in the optical data burst.

Once the sensors demodulate data impressed upon the optical sub-carrier, beacon disambiguation may be effected in certain embodiments by modulating the beacon rotor lasers with a code specific to each beacon. This can be short, sufficiently short to fit within the small window of time that a beacon's swept beam illuminates a sensor. This may constrain the sub-carrier frequency choice, range, and beam divergence/sensor area in ways that interact with the system noise constraints. This may be of no consequence, because as long as some beacons are disambiguated by the system the general location of the receiver can be determined in most cases, and this may sufficient, depending on the requirements of each particular implementation.

The optical coverage of the omnidirectional synchronization emissions in certain embodiments may cover the same area as the rotor sweeps and be of sufficient power to have the same or greater range. This range requirement can be limiting in certain implementations, as the pulse power of an omnidirectional source compared to the beamed rotor signals can be significant. Fortunately, the duty cycle is typically low, and this allows relatively economic devices to be utilized.

For the optical-data-burst synchronization system, in certain embodiments a centralized Synchronization Hub ("Sync Hub") is utilized. The Sync Hub in certain embodiments contains the system timebase and generates a synchronization signal to which all beacons in the system lock their rotor phases. The Sync Hub in certain embodiments also measures the actual rotor phases indicated by their reference signals with respect to the system timebase and transmits rotor phase correction information (for the previous half-frame) as part of the optical synchronization burst, along with calibration and constellation configuration information.

Unless the optical synchronization pulses use a different carrier frequency and the sensors are designed to separate the synchronization and rotor signals (by carrier or code multiplexing) the synchronization pulses consume some part of the angular space the beacons might illuminate. This angular-cost can be small in certain embodiments, as long as the data burst is short. Using an out-of-band communication method (e.g. RF) in certain embodiments may be simpler and cheaper to implement than narrow filtering at the sensors. Inter-symbol interference path delays in the optical synchronization flashing system may be present at the receiver. Error recovery may be effected by spatial redundancy.

Each base station in certain embodiments contains a precision clock to which each rotor's angular frequency is locked. Alternatively, an external signal, including one generated in another base station or in a synchronization hub can be injected to allow locking of multiple base stations together. For simplicity of disambiguation at the receiver in certain embodiments the two rotors scan 180 degrees out of phase, illuminating the area of tracking alternately.

The sensors in certain embodiments comprise medium-area silicon photodiodes, the output signal of which is amplified by discrete BJT amplifiers. The signal seen at a receiver as a rotor beam sweeps past it in certain embodiments is a Gaussian burst of sub-carrier RF modulation. This RF pulse train is envelope detected, shaped and run through a level comparator in certain embodiments to extract a pulse spanning the time the sensor was illuminated by the beam. The circuit is designed in certain embodiments such that the edge positions accurately represent the passage of the beam, regardless of the orientation of the sensor with respect to the beam source.

The receiver in certain embodiments is a high-speed digital logger which accurately timestamps the edges coming from the sensor channels and reference signals originating at the base stations. It is implemented using a small FPGA and a microcontroller. The microcontroller manages the high-speed FPGA front-end and the inertial unit and packages the data stream for delivery back to a host computer over USB for processing.

The mechanically scanned beacon rotors can be potentially replaced by other techniques in certain embodiments, or may function in a similar manner, but radiate a more complicated signal than a single swept beam.

MEMSs or diffractive optical elements for scanning in certain embodiments may help reduce the size and power consumption of the base stations, but may have some constraints in simplicity, linearity and scan angle. Using spatial orthogonal codes instead of single beams allows easier differentiation of individual beacons at the sensor/receiver in certain embodiments. Without limitation, such codes might be implemented using mechanical scanning, or switched projection sources.

Distance from the beacon can be detected via several methods, such as phase measurement of the optical modulation carrier.

Accurate determination of the position and orientation of objects in space is an important aspect of many computer interface devices, including head-mounted virtual reality displays and motion capture systems. Exemplary systems described herein use precisely timed rotating laser line beam projectors to measure the angle to an array of optical sensors located on the object to be tracked. The angle information from one or more of these transmitter stations in certain embodiments optionally fused with inertial measurements from an IMU co-located with the optical sensor array on the tracked object to provide low latency, high resolution and high accuracy measurement of its position (and motion).

Sensor units installed on the transmitter stations in certain embodiments allow the system to determine its own configuration and a combination of in-beam signaling and out-of-band (wired or RF) communication between transmitters and tracked objects allow bootstrapping the system and simplify its calibration.

Inertial sensors co-located with the optical detectors on the device to be tracked in certain embodiments allow sensor fusion filters to produce high-rate and high-quality position estimates at arbitrary time intervals.

Reflections from highly reflecting objects in the tracked volume (such as mirrors) can produce confusing extraneous signals for the system to process. The algorithms used in solving for object pose in certain embodiments reject most interfering reflections, and the use of circular polarization of the scanning beams and sensors to reject reflected signals in certain embodiments can reduce the magnitude of this problem. In general, however, the exemplary systems described herein are already quite resistant to interfering reflections by virtue of their geometry.

Occlusion is a problem common to all optical tracking technologies and is most easily managed in certain embodiments by providing additional transmitting stations surrounding the tracking volume. Station redundancy in certain embodiments not only offers better visibility of tracking receivers but also provides more information to the tracking solver for overdetermined solutions.

The system according to aspects of the present invention in certain embodiments can be implemented in an inside-out (rather than outside-in) manner, with scanned transmitters on the object to be tracked and a fixed receiver constellation. Alternatively the fixed receiver field of view can be scanned and omnidirectional mobile transmitters detected. There are inertial, bootstrapping, power and link budget constraints on these system-dual approaches.

Depending on the requirements of each particular implementation, the scanned optical beams can be formed in many ways. Certain embodiments use a rotating mirror/prism and line-generator optical element. Alternative approaches use MEMS mirrors, rotating polygon mirrors, gratings and other holographic techniques. The beam radiation need not be coherent in certain embodiments. The beam radiation wavelength can be almost any color, but invisible near-IR is convenient in certain embodiments and corresponds to the peak wavelength sensitivity of relatively inexpensive and readily commercially available silicon photodetectors.

In certain embodiments, only a single spinning rotor is required to compute the same two angular bearings. This is possible through the use of projection patterns.

Figure 23:
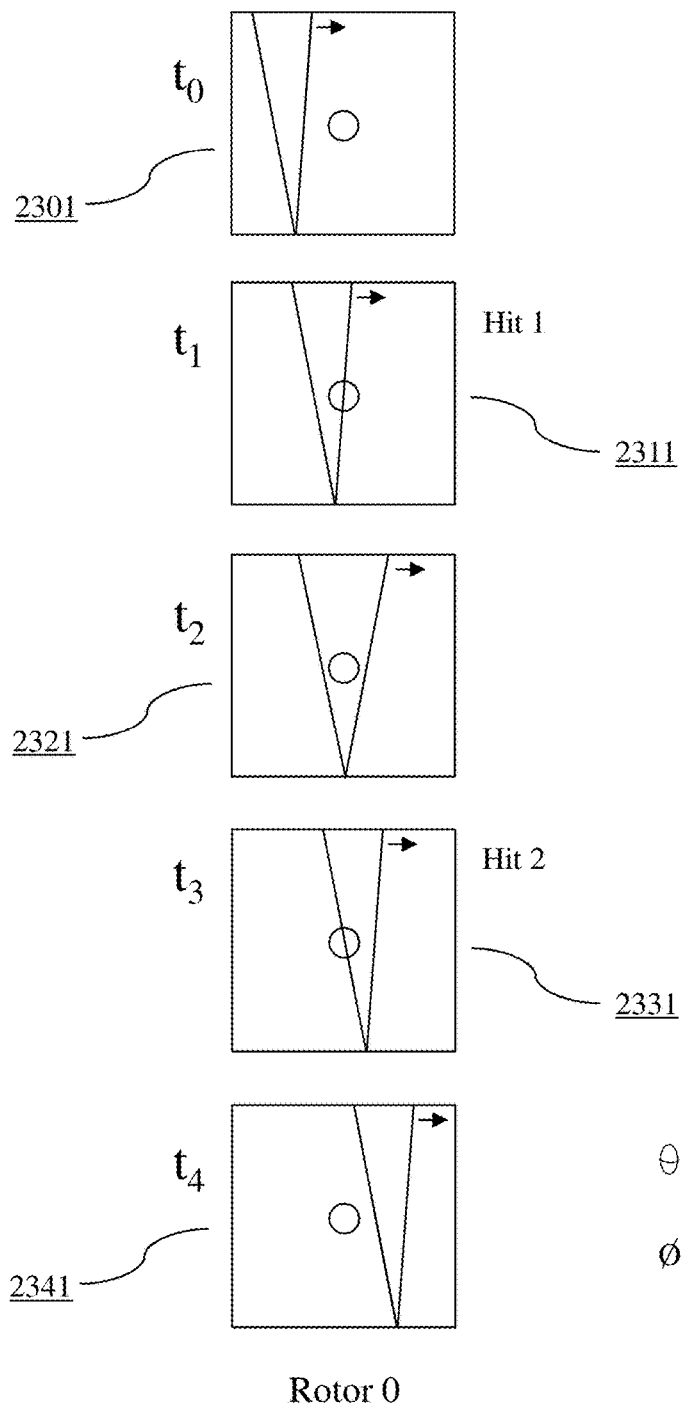
FIG. 23 depicts aspects of one embodiment of a single-rotor implementation.

According to Scheme 1 of a single-rotor implementation (see FIG. 23), instead of projecting a single beam, two oblique lines are projected across the scene by a single-rotor in a "V" pattern. Thus, for each sweep of a single rotor, each sensor receives potentially two hits (instead of one, as in a dual-rotor system). The horizontal angular component relative to the rotor (theta) is computed by timing the duration from the start of the rotor sweep to the center of the rotors hits. The vertical angular component relative to the rotor (phi), is computed by measuring the difference in time between the two rotors hits. As the "V" sweeps across the scene, near the apex of the "V" pattern the two sensor hits will be close together in time, while at the opposite vertical height in the scene the sensor two hits will be proportionally farther apart. So measuring the time between hits (from each "arm" of the V pattern) is an implicit measurement of the vertical sensor position.

Figure 24:
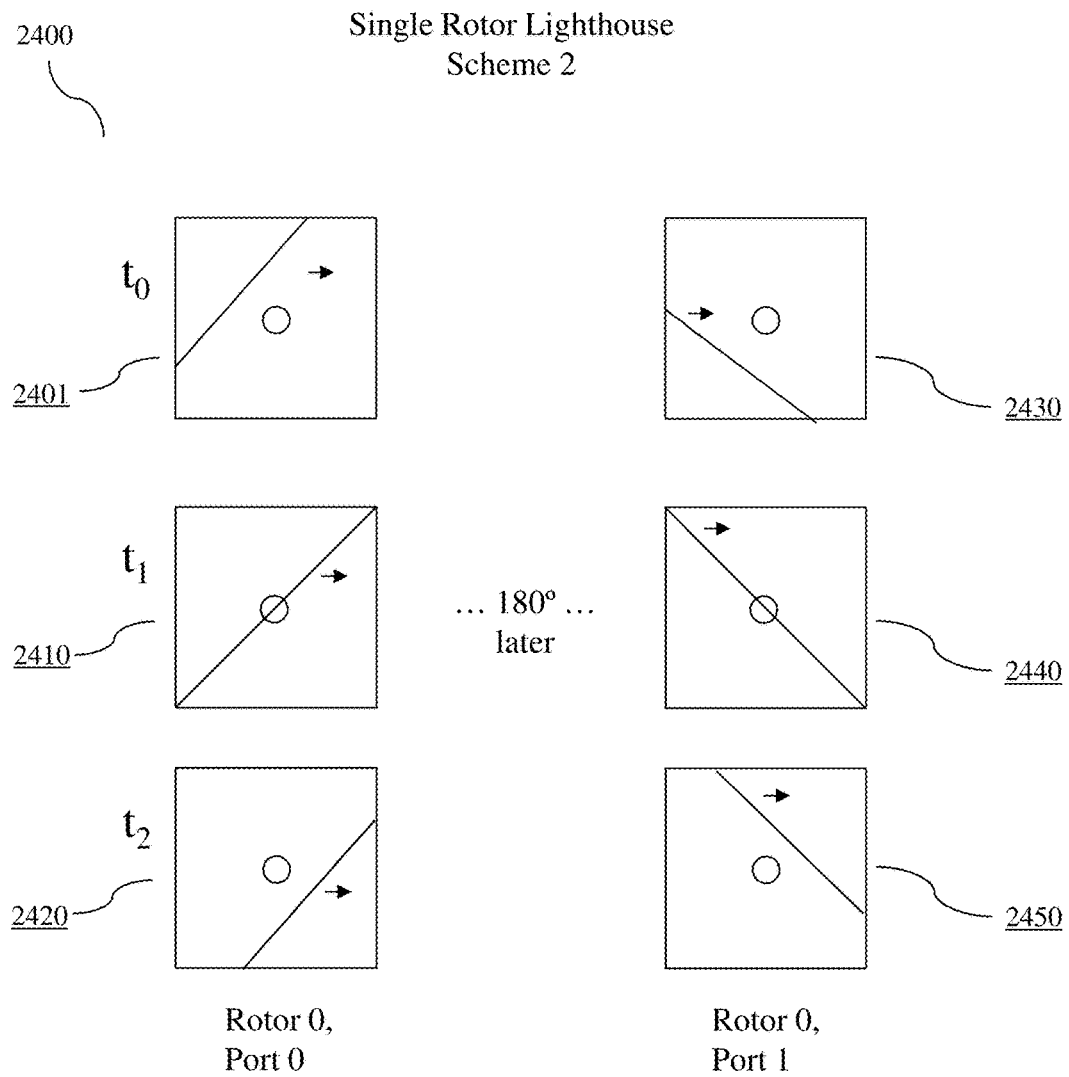
FIG. 24 depicts aspects of one embodiment of a single-rotor implementation.

Scheme 2 of a single-rotor implementation leverages a rotor design where more than two or more linear beams are emitted from different output ports on a single rotor (see FIG. 24). If these output ports project lines which are mutually oblique relative to each other, then both angles (phi, theta) from the base station relative to the sensor can be computed using plane intersections. Conceptually this is similar to Scheme 1, except that each arm of the V is individually projected across the scene sequentially, each being emitted from opposite sides of a single rotor. The physical rotor design for Scheme 2 may be more readily realizable than in Scheme 1 in certain implementations. Thus, strict orthogonality of the optical beams is not required, regardless of the number of rotors in a particular embodiment, so long as the beams cross in some relevant sense and are not degenerate (i.e., so long as the beams are sufficiently inclined with respect to each other to provide information in two orthogonal elements of the tracking coordinate system basis).

In certain embodiments, laser diodes and electronics may be embedded in the rotors and powered via a rotary transformer.

In certain embodiments, dual-output laser diodes may be incorporated, which emit light from each end of the laser diode die and can be aligned more precisely with a fan lens.

Certain embodiments implement beam center angles between 0 and 180 degrees of rotor phase to remove ambiguity and allow 360-degree coverage.

Certain embodiments implement synchronization offsetting using various schemes known to skilled artisans to remove the blind spot in phase space that may be associated with in-band optical synchronization.

One embodiment of base station disambiguation locks two or more base stations together with a slight phase offset (slightly more than the duration of the longest synchronization pulse) to prevent synchronization collision and rotates laser scanning of the tracking volume between the base stations. Within each frame of scanning all base stations transmit synchronization pulses to ensure the receiver can maintain lock and to facilitate transmission of identification and calibration information for each base station. However, in certain embodiments, within any particular frame only one of the base stations in the collection sweeps the tracking volume with its lasers.

One embodiment of synchronization between base stations may be optical. If an optical sensor otherwise identical to the sensors used in tracked objects is placed within slave base stations, the slave stations may detect and lock onto the synchronization pulse emissions of a master base station and adjust their own time base to match. This method may be utilized in the time-alternating method previously described, or used in more general systems.

In embodiments where all base stations have optical or radio transceivers, the Sync Hub previously described can be implemented in a distributed manner, in which all base stations participate without the need for a centralized sync hub device and the associated cabling.

Figure 25:
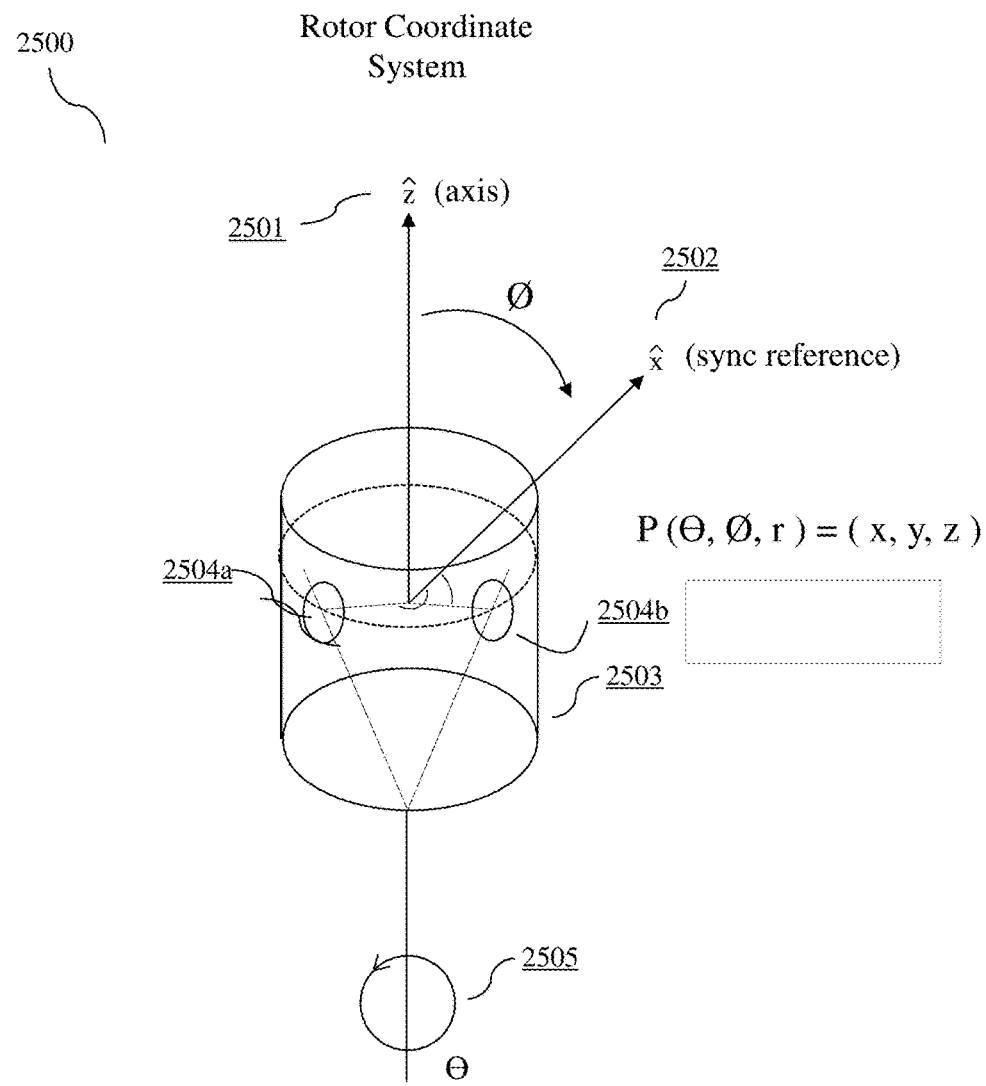
FIG. 25 depicts aspects of one embodiment of a rotor coordinate system according to aspects of the present invention.

FIG. 25 depicts aspects of one embodiment of a rotor coordinate system and architecture (2500) according to aspects of the present invention. The rotor (2503) spins about a z axis (2501), for example in a counter-clockwise direction (2505). The rotor in certain embodiments includes two optical output ports (2504*a*, 2504*b*), each of which emits an optical beam that is angled with respect to the other one. A synchronization reference (2502) is also emitted, as described earlier.

Figure 26:
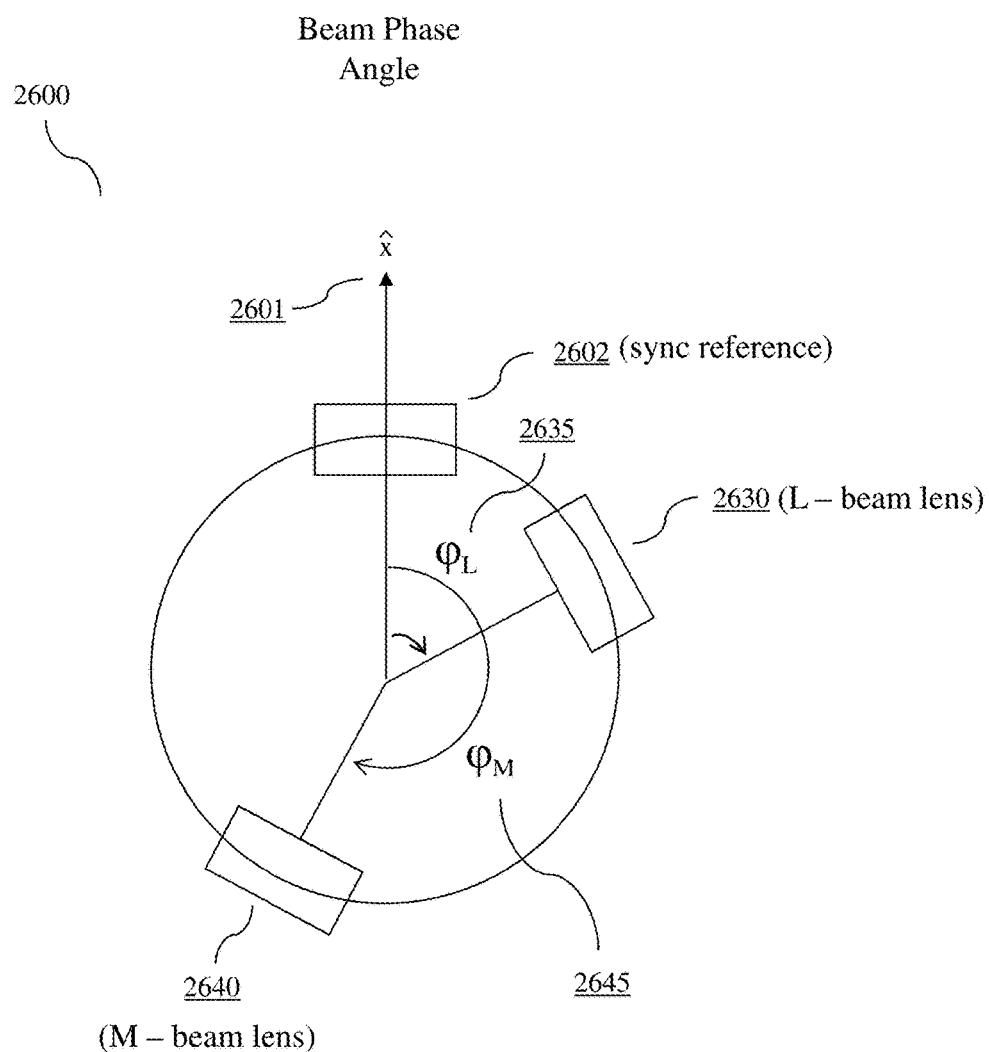
FIG. 26 depicts aspects of one embodiment, relating to beam phase angle, according to aspects of the present invention.

FIG. 26 depicts aspects of one embodiment (2600), relating to beam phase angle, according to aspects of the present invention. FIG. 26 provides a top view of the embodiment that was depicted in FIG. 25.

Figure 27:
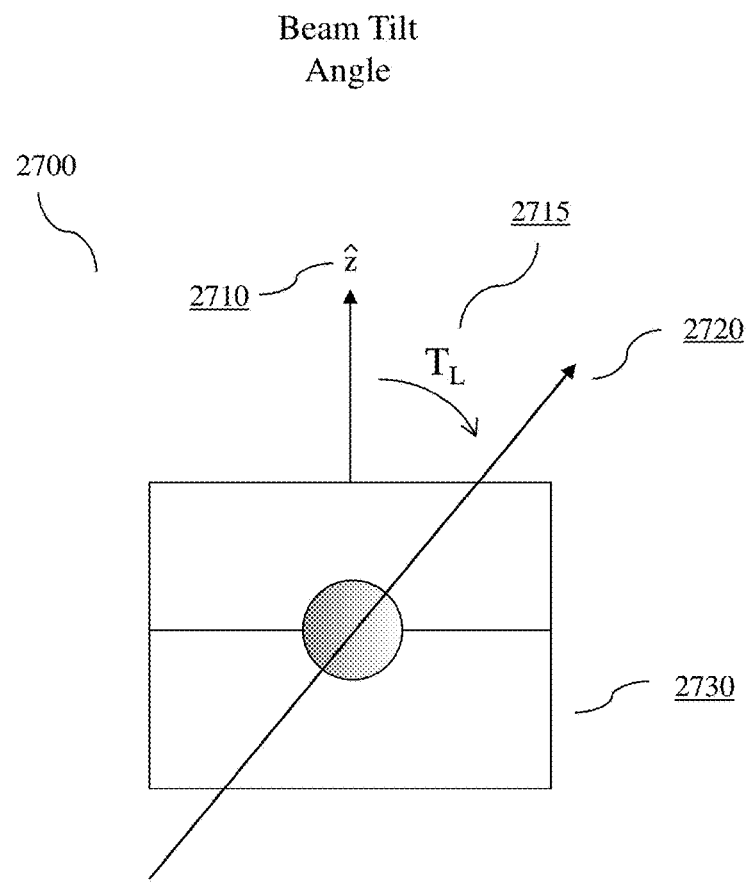
FIG. 27 depicts aspects of one embodiment, relating to beam tilt angle, according to aspects of the present invention.

FIG. 27 depicts aspects of one embodiment (2700), relating to beam tilt angle ($T_L$, 2715) according to aspects of the present invention. FIG. 27 provides a side view of the embodiment that was depicted in FIG. 25.

Figure 28A:
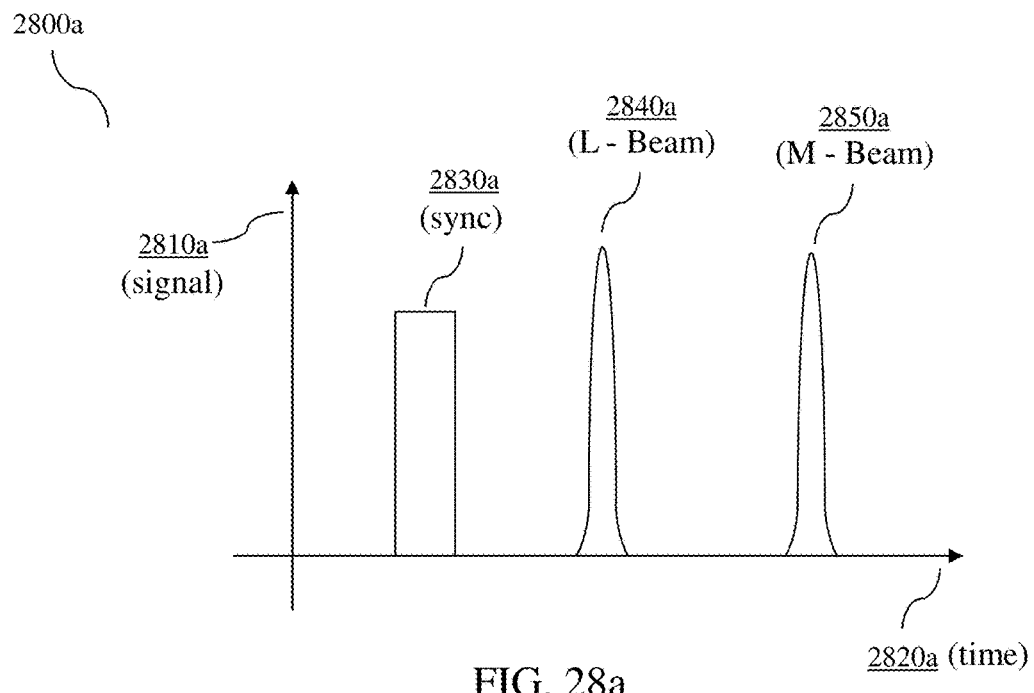
FIGS. 28a and 28b depict aspects of one embodiment, relating to synchronization pulses and optical beam pulses, according to aspects of the present invention.
Figure 28B:
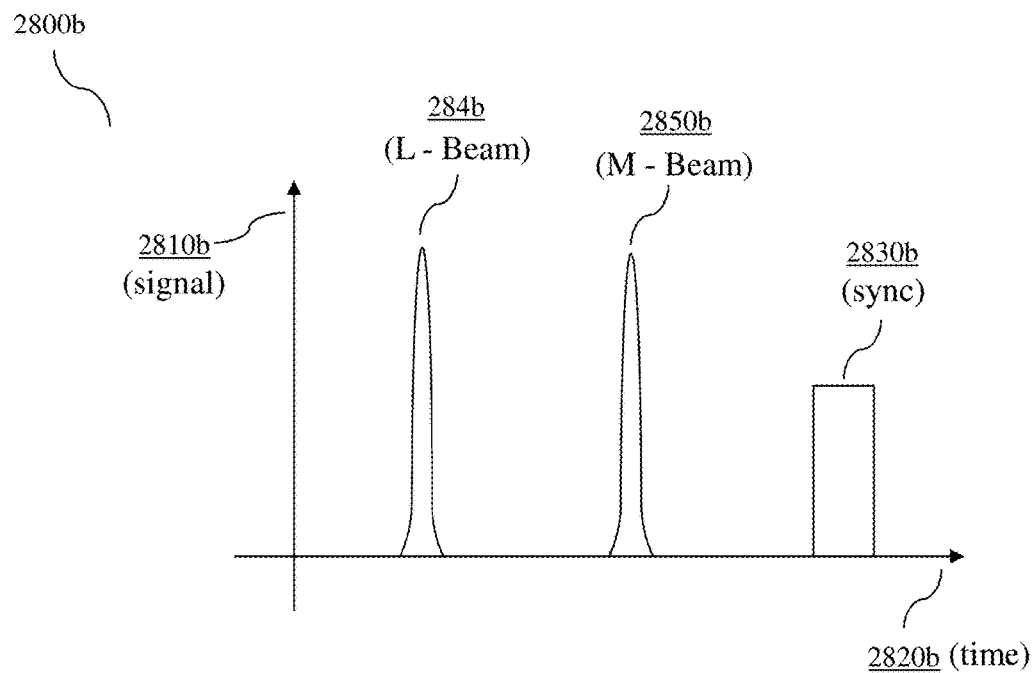

FIGS. 28a and 28b depict aspects of certain embodiments (2800a, 2800b), relating to synchronization pulses and optical beam pulses, according to aspects of the present invention. FIGS. 28a and 28b depict the optical pulses that are emitted as function of time by the embodiment that was depicted in FIG. 25.

Figure 29:
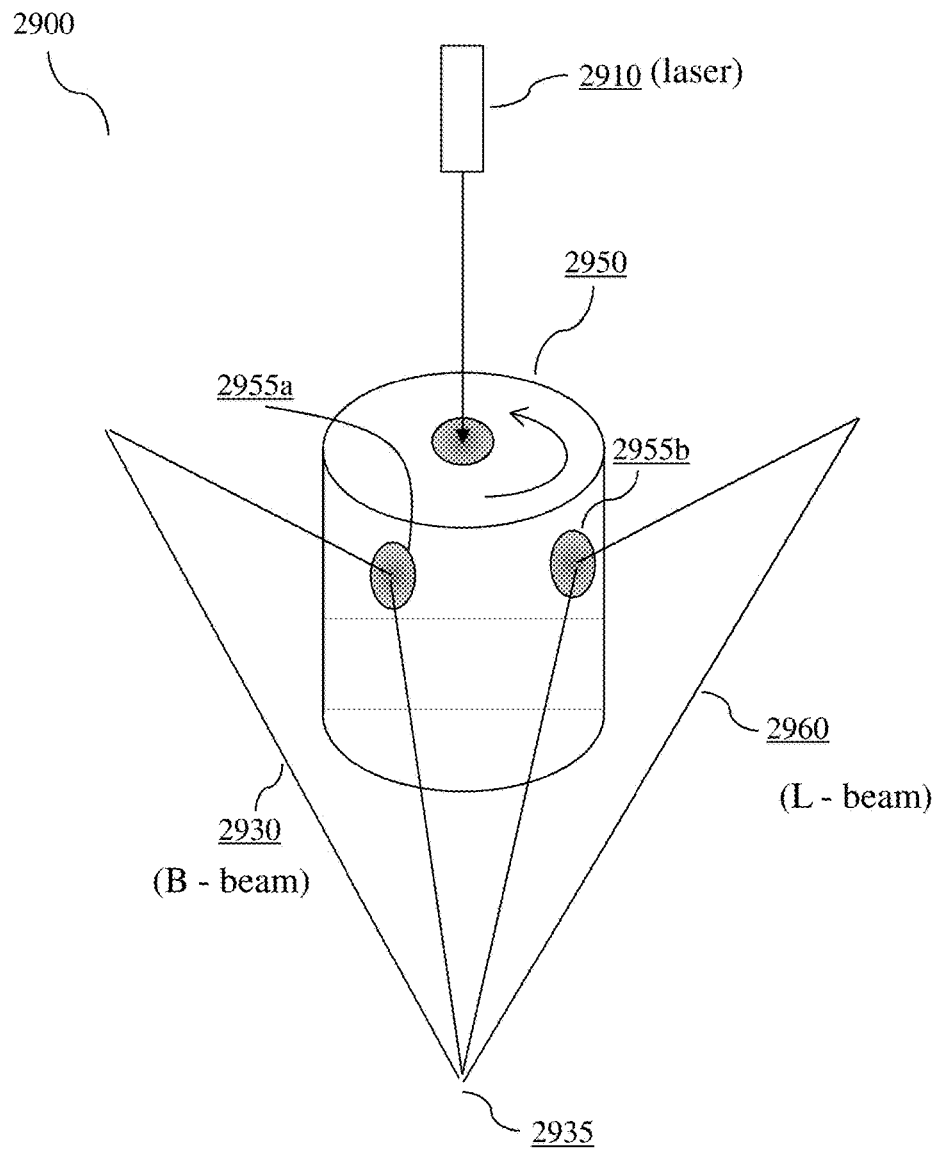
FIG. 29 depicts aspects of one embodiment of the present invention.

FIG. 29 depicts aspects of one embodiment (2900) of the present invention. Rotor 2950 spins, for example in a counter-clockwise direction. An optical beam emitted from laser source 2910 is split and redirected within rotor 2950, and two beams/planes of light (2930, 2960) are emitted from two output ports (2955a, 2955b) on rotor 2950. As shown in FIG. 29, the optical beams (2930, 2960) cross at point 2935.

Figure 30:
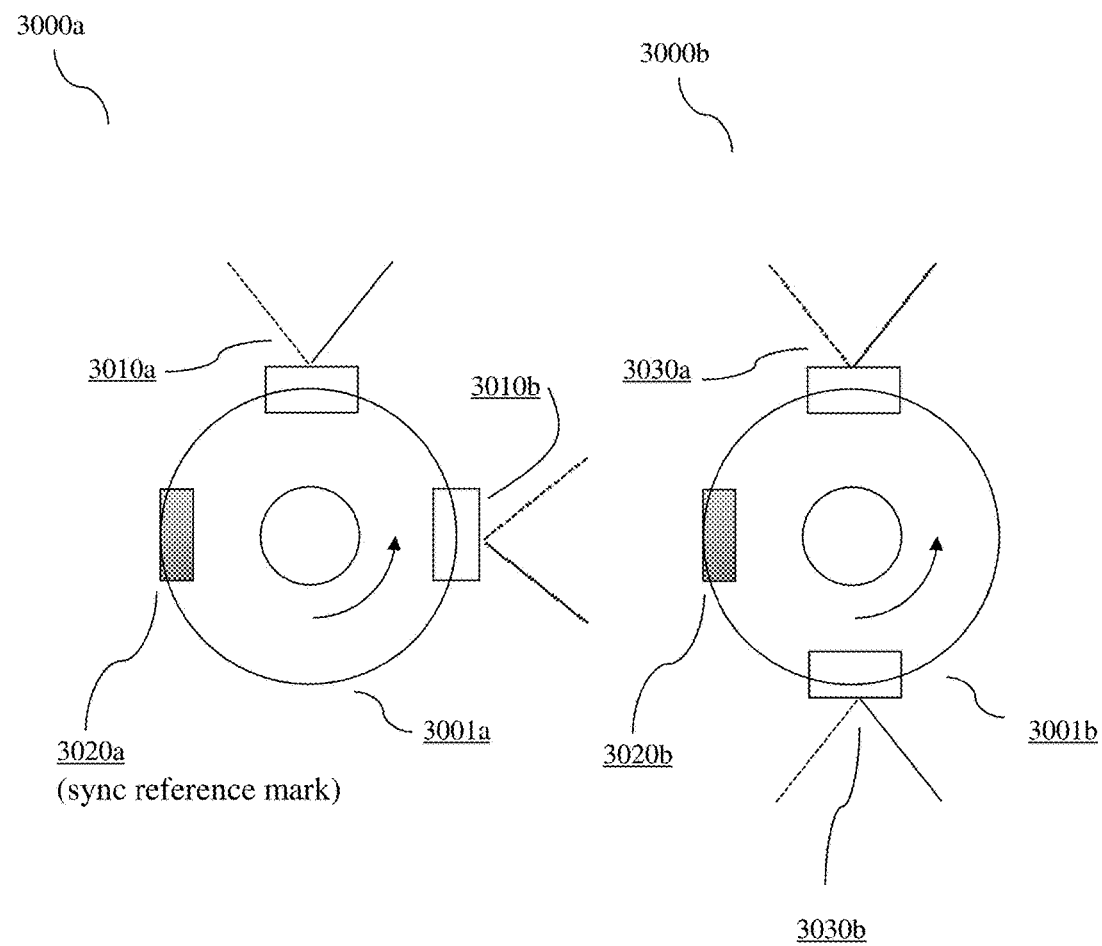
FIG. 30 depicts aspects of one embodiment of the present invention.

FIG. 30 depicts aspects of embodiments of the present invention. In one embodiment (3000a), rotor (3001a) spins counter-clockwise and comprises a sync reference mark port (3020a) as well as orthogonally located beam output ports 3010a and 3010b. In another embodiment (300ba), rotor (3001b) spins counter-clockwise and comprises a sync reference mark port (3020a) as well as oppositely located beam output ports 3030a and 3030b.

Figure 31:
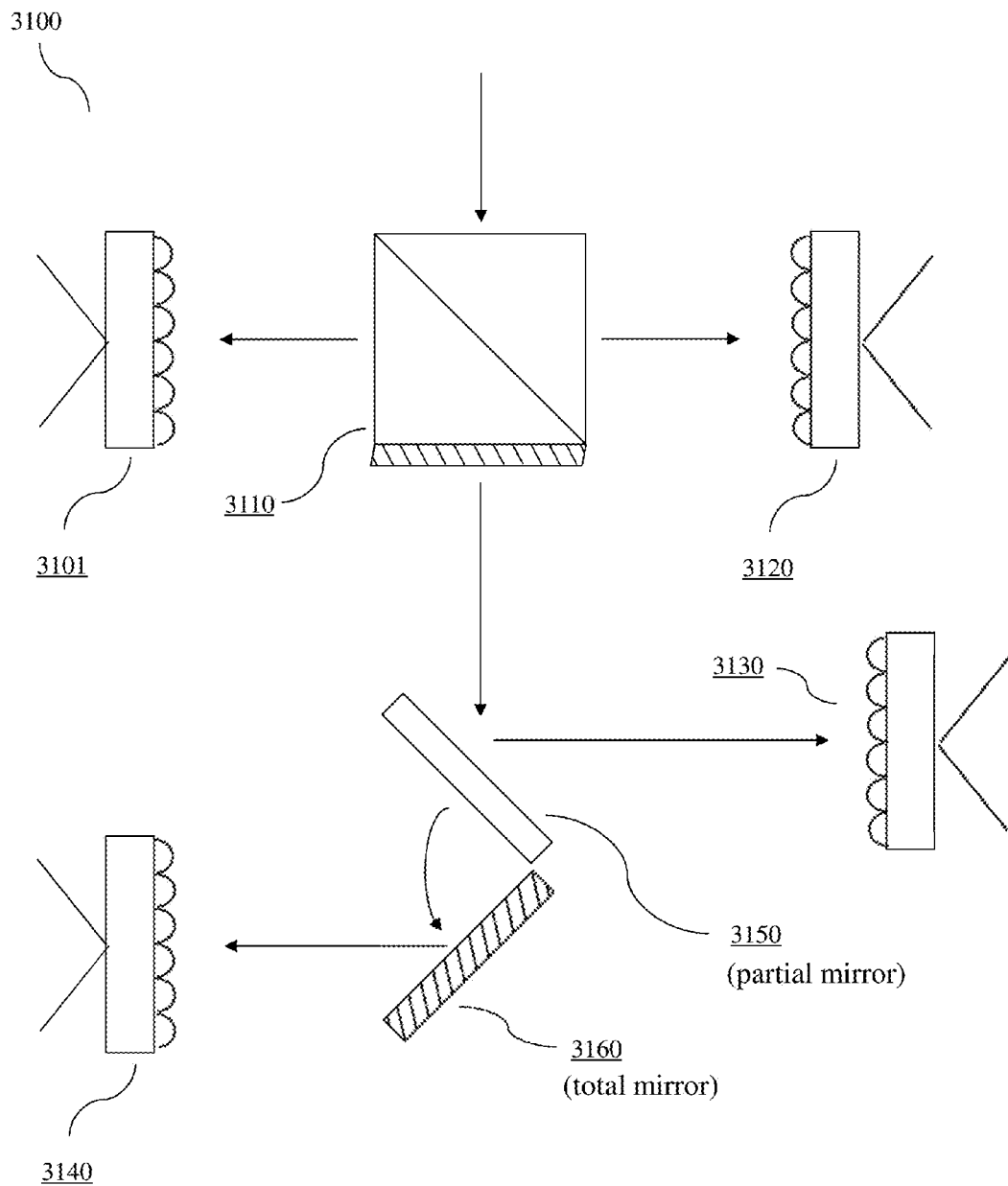
FIG. 31 depicts aspects of one embodiment of the present invention.

FIG. 31 depicts aspects of one embodiment (3100) of the present invention, showing an exemplary version of how incoming light (at the top of the diagram) may be split and directed to multiple output ports on a rotor.

Figure 32:
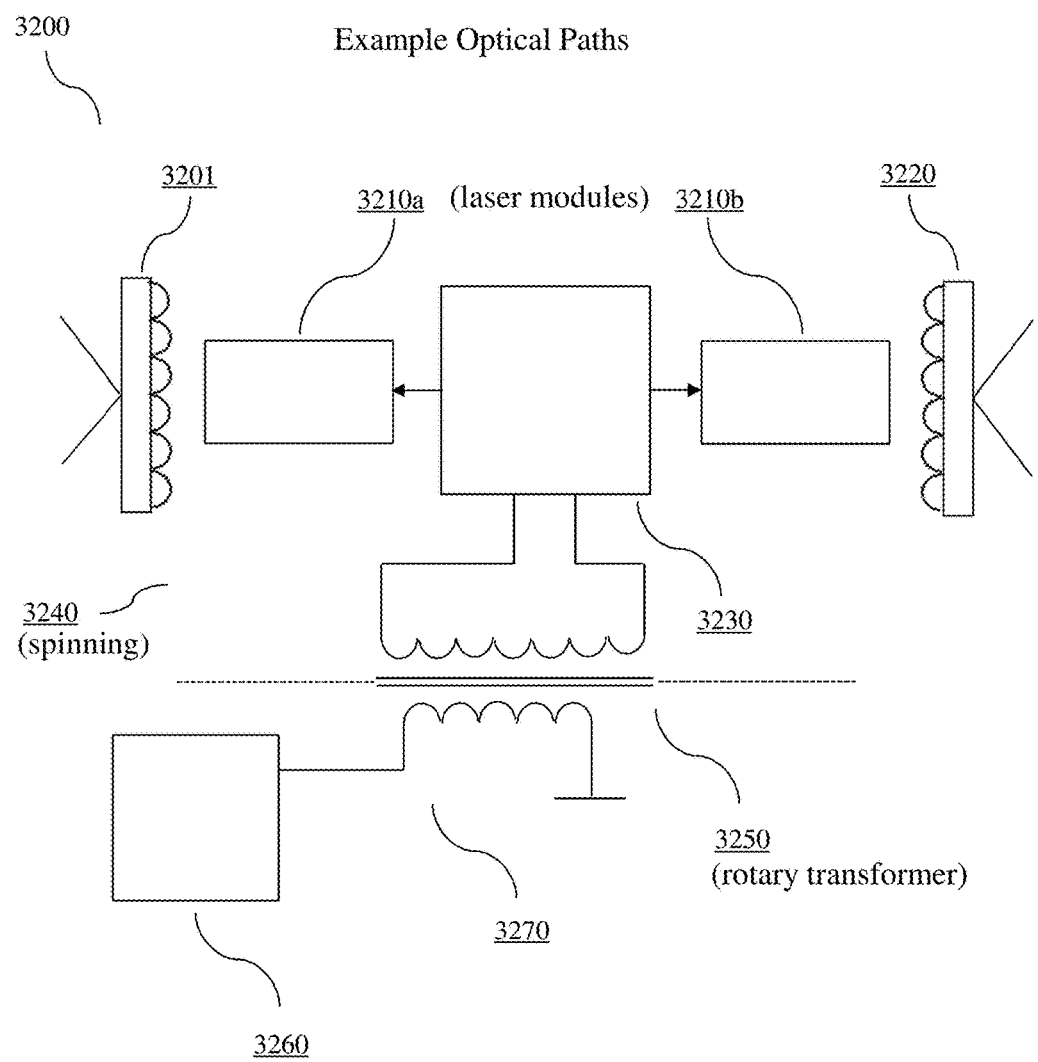
FIG. 32 depicts aspects of one embodiment of the present invention.

FIG. 32 depicts aspects of one embodiment (3200) of the present invention, depicting how rotation control signal generator (3260) effects rotation of the rotor (3230), which comprises multiple laser modules (3210a, 3210b) and output ports (3201, 3220).

Figure 33:
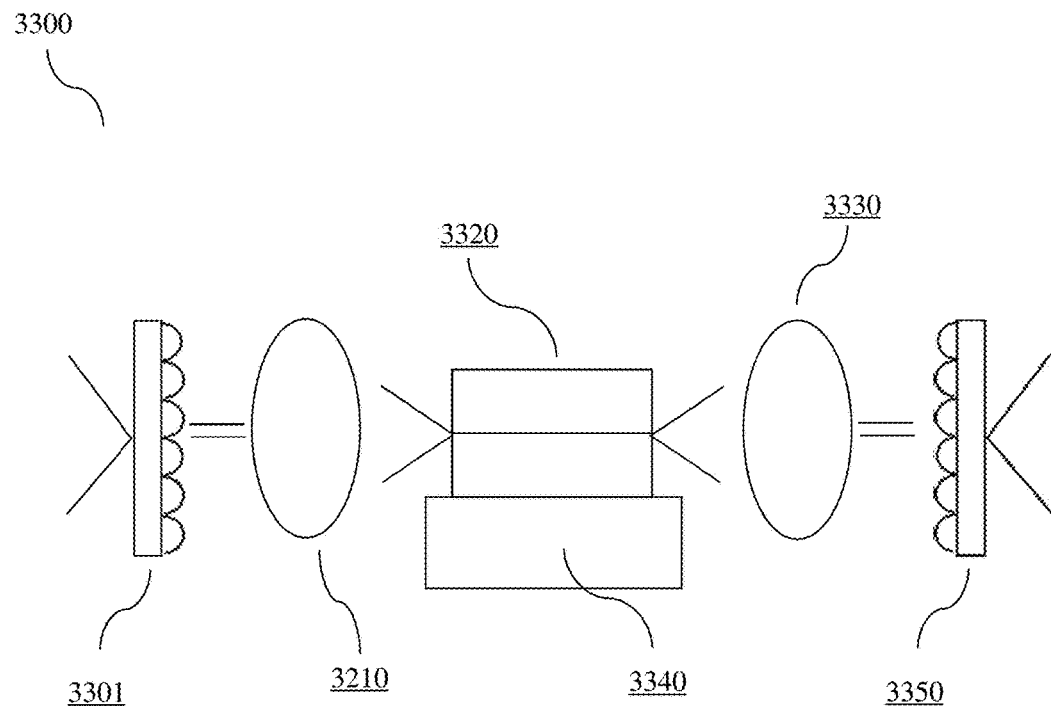
FIG. 33 depicts aspects of one embodiment of the present invention.

FIG. 33 depicts aspects of another embodiment (3300) of the present invention, showing a rotor 3340 with multiple optical beam output ports.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub-combination of the elements from the different species and/or embodiments disclosed herein.

We claim:

1. An optical tracking system, comprising;
a movable tracked object comprising a plurality of rigidly attached optical sensors; and
one or more optical transmitters, wherein each transmitter comprises two rotors that sweep two optical beams across a tracking volume on orthogonal axes during repeating sweep cycles, wherein each transmitter emits an omni-directional synchronization optical pulse detectable by said plurality of optical sensors at the beginning of each said sweep cycle; and wherein each of said optical sensors computes an angular location within said tracking volume by calculating the elapsed time between detecting said synchronization pulse and detecting said optical beams.

2. An optical tracking system, comprising:
a movable tracked object comprising a plurality of rigidly attached optical sensors; and
one or more optical transmitters, wherein each transmitter comprises one rotor that sweeps two optical beams across a tracking volume on axes that are inclined with respect to each other during repeating sweep cycles, wherein each transmitter emits an omni-directional synchronization optical pulse detectable by said plurality of optical sensors at the beginning of each said sweep cycle; and wherein each of said optical sensors computes an angular location within said tracking volume by calculating the elapsed time between detecting said synchronization pulse and detecting said optical beams.

3. The system of claim 1, wherein said movable tracked object further comprises an inertial measurement unit and wherein said inertial measurement unit provides information to said optical tracking system related to the location and orientation of said movable tracked object.

4. The system of claim 2, wherein said movable tracked object further comprises an inertial measurement unit and wherein said inertial measurement unit provides information to said optical tracking system related to the location and orientation of said movable tracked object.

5. The system of claim 1, wherein said movable tracked object comprises an array of more than one rigidly attached optical sensors.

6. The system of claim 2, wherein said movable tracked object comprises an array of more than one rigidly attached optical sensors.

7. The system of claim 3, wherein said movable tracked object comprises an array of more than one rigidly attached optical sensors.

8. The system of claim 4, wherein said movable tracked object comprises an array of more than one rigidly attached optical sensors.

9. The system of claim 1, wherein each of said rotors emits a spatially time-varying signal.

10. The system of claim 2, wherein each of said rotors emits a spatially time-varying signal.

11. The system of claim 9, wherein each of said spatially time-varying signals is produced by a line of light, swept radially around the rotor axis plane of the corresponding rotor at a constant rate.

12. The system of claim 11, wherein said line of light comprises near infrared light.

13. The system of claim 11, wherein said line of light comprises visible light.

14. The system of claim 10, wherein each of said spatially time-varying signals is produced by a line of light, swept radially around the rotor axis plane of the corresponding rotor at a constant rate.

15. The system of claim 14, wherein said line of light comprises near infrared light.

16. The system of claim 14, wherein said line of light comprises visible light.

17. The system of claim 9, wherein each said spatially time-varying signal is modulated to facilitate differentiation from interfering signals within said tracking volume.

18. The system of claim 9, wherein each said spatially time-varying signal comprises a circularly polarized radiation source and matched polarizing filters at each of said sensors.

19. The system of claim 10, wherein each said spatially time-varying signal is modulated to facilitate differentiation from interfering signals within said tracking volume.

20. The system of claim 10, wherein each said spatially time-varying signal comprises a circularly polarized radiation source and matched polarizing filters at each of said sensors.

21. The system of claim 1, wherein each of said optical transmitters generates a plurality of optical signals.

22. The system of claim 2, wherein each of said optical transmitters generates a plurality of optical signals.

23. The system of claim 1, wherein each said rotor comprises an absolute phase reference detector.

24. The system of claim 2, wherein each said rotor comprises an absolute phase reference detector.

25. The system of claim 1, wherein each said optical transmitter comprises a precision clock to which each of said rotor's angular frequency is locked.

26. The system of claim 2, wherein each said optical transmitter comprises a precision clock to which each of said rotor's angular frequency is locked.

27. The system of claim 1, wherein each of said rotors emits a specific spatially time-varying signal.

28. The system of claim 2, wherein each of said rotors emits a specific spatially time-varying signal.

29. The system of claim 1, further comprising a synchronization hub that comprises a system timebase and generates a synchronization signal to which all said optical transmitters in said system lock their rotor phases.

30. The system of claim 2, further comprising a synchronization hub that comprises a system timebase and generates a synchronization signal to which all optical transmitters in said system lock their rotor phases.

31. The system of claim 2, wherein each of said two optical beams swept by each said rotor is emitted from each of two opposite sides of said rotor.

32. The system of claim 2, wherein each of said two optical beams swept by each said rotor is emitted from each of two opposite sides of said rotor.

33. An optical tracking method, comprising the steps of:
emitting from one or more optical transmitters, wherein each transmitter comprises two rotors that sweep two optical beams across a tracking volume on orthogonal axes during repeating sweep cycles, an omni-directional synchronization optical pulse detectable by a plurality of rigidly attached optical sensors located on a movable tracked object at the beginning of each said sweep cycle; and
computing an angular location within said tracking volume with respect to each of said optical sensors by calculating the elapsed time between detecting said synchronization pulse and detecting said optical beams at each of said optical sensors.

34. An optical tracking method, comprising the steps of:
emitting from one or more optical transmitters, wherein each transmitter comprises one rotor that sweeps two optical beams across a tracking volume on axes that are inclined with respect to each other during repeating sweep cycles, an omni-directional synchronization optical pulse detectable by a plurality of rigidly attached optical sensors located on a movable tracked object at the beginning of each said sweep cycle; and
computing an angular location within said tracking volume with respect to each of said optical sensors by calculating the elapsed time between detecting said synchronization pulse and detecting said optical beams at each of said optical sensors.

35. The method of claim 33, further comprising performing an inertial measurement calculation that provides information to said optical tracking method related to the location and orientation of said movable tracked object.

36. The method of claim 34, further comprising performing an inertial measurement calculation that provides information to said optical tracking method related to the location and orientation of said movable tracked object.

37. The method of claim 33, wherein said movable tracked object comprises an array of more than one rigidly attached optical sensors.

38. The method of claim 34, wherein said movable tracked object comprises an array of more than one rigidly attached optical sensors.

39. The method of claim 35, wherein said movable tracked object comprises an array of more than one rigidly attached optical sensors.

40. The method of claim 36, wherein said movable tracked object comprises an array of more than one rigidly attached optical sensors.

41. The method of claim 33, wherein each of said rotors emits a spatially time-varying signal.

42. The method of claim 34, wherein each of said rotors emits a spatially time-varying signal.

43. The method of claim 41, wherein each of said spatially time-varying signals is produced by a line of light, swept radially around the rotor axis plane of the corresponding rotor at a constant rate.

44. The method of claim 43, wherein said line of light comprises near infrared light.

45. The method of claim 43, wherein said line of light comprises visible light.

46. The method of claim 42, wherein each of said spatially time-varying signals is produced by a line of light, swept radially around the rotor axis plane of the corresponding rotor at a constant rate.

47. The method of claim 46, wherein said line of light comprises near infrared light.

48. The method of claim 46, wherein said line of light comprises visible light.

49. The method of claim 41, wherein each said spatially time-varying signal is modulated to facilitate differentiation from interfering signals within said tracking volume.

50. The method of claim 41, wherein each said spatially time-varying signal comprises a circularly polarized radiation source and matched polarizing filters at each of said sensors.

51. The method of claim 42, wherein each said spatially time-varying signal is modulated to facilitate differentiation from interfering signals within said tracking volume.

52. The method of claim 42, wherein each said spatially time-varying signal comprises a circularly polarized radiation source and matched polarizing filters at each of said sensors.

53. The method of claim 33, wherein each of said optical transmitters generates a plurality of optical signals.

54. The method of claim 34, wherein each of said optical transmitters generates a plurality of optical signals.

55. The method of claim 33, further comprising performing absolute phase reference detection with respect to each said rotor.

56. The method of claim 34, further comprising performing absolute phrase reference detection with respect to each said rotor.

57. The method of claim 33, further comprising locking each of said rotors' angular frequency to a precision clock corresponding to each of said optical transmitters.

58. The method of claim 34, further comprising locking each of said rotors' angular frequency to a precision clock corresponding to each of said optical transmitters.

59. The method of claim 33, wherein each of said rotors emits a specific spatially time-varying signal.

60. The method of claim 34, wherein each of said rotors emits a specific spatially time-varying signal.

61. The method of claim 33, further comprising generating a synchronization signal to which all said optical transmitters lock their rotor phases.

62. The method of claim 34, further comprising generating a synchronization signal to which all said optical transmitters lock their rotor phases.

63. The method of claim 34, wherein each of said two optical beams swept by each said rotor is emitted from each of two opposite sides of said rotor.

64. The method of claim 34, wherein each of said two optical beams swept by each said rotor is emitted from each of two opposite sides of said rotor.

65. An optical tracking system, comprising;

a movable tracked object comprising one or more rigidly attached optical sensors; and one or more optical transmitters, wherein each transmitter comprises a precision clock and two rotors that sweep two optical beams across a tracking volume on orthogonal axes during repeating sweep cycles, wherein an angular frequency of each of said rotors is locked to said precision clock, and wherein each transmitter emits an omni-directional synchronization optical pulse detectable by said optical sensors at the beginning of each said sweep cycle; and wherein each of said optical sensors computes an angular location within said tracking volume by calculating the elapsed time between detecting said synchronization pulse and detecting said optical beams.

\* \* \* \* \*